US010676547B2

(12) United States Patent
Holtcamp et al.

(10) Patent No.: US 10,676,547 B2
(45) Date of Patent: Jun. 9, 2020

(54) ALUMINUM ALKYLS WITH PENDANT OLEFINS ON CLAYS

(71) Applicant: ExxonMobil Chemical Patents Inc., Baytown, TX (US)

(72) Inventors: Matthew W. Holtcamp, Huffman, TX (US); Gregory S. Day, College Station, TX (US); John R. Hagadorn, Houston, TX (US); Patrick J. Palafox, Hattiesburg, MS (US); Ramyaa Mathialagan, Mont Belvieu, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/744,475

(22) PCT Filed: Aug. 10, 2016

(86) PCT No.: PCT/US2016/046404
§ 371 (c)(1),
(2) Date: Jan. 12, 2018

(87) PCT Pub. No.: WO2017/039994
PCT Pub. Date: Mar. 9, 2017

(65) Prior Publication Data
US 2018/0201700 A1 Jul. 19, 2018

Related U.S. Application Data

(60) Provisional application No. 62/332,921, filed on May 6, 2016, provisional application No. 62/212,405, filed on Aug. 31, 2015.

(30) Foreign Application Priority Data

Jun. 28, 2016 (EP) ..................................... 16176534

(51) Int. Cl.
*C08F 4/642* (2006.01)
*C08F 4/6592* (2006.01)
*C08F 10/02* (2006.01)
*C08F 210/16* (2006.01)
*C08F 4/659* (2006.01)

(52) U.S. Cl.
CPC .......... *C08F 10/02* (2013.01); *C08F 4/65912* (2013.01); *C08F 4/65916* (2013.01); *C08F 4/659* (2013.01); *C08F 4/65925* (2013.01); *C08F 4/65927* (2013.01); *C08F 210/16* (2013.01)

(58) Field of Classification Search
CPC .............. C08F 4/65912; C08F 4/65916; C08F 110/02; C08F 110/06; C08F 210/16
See application file for complete search history.

(56) References Cited

U.S. PATENT DOCUMENTS

| | | |
|---|---|---|
| 4,874,734 A | 10/1989 | Kioka et al. |
| 5,122,491 A | 6/1992 | Kioka et al. |
| 5,155,078 A | 10/1992 | Kioka et al. |
| 5,234,878 A | 8/1993 | Tsutsui et al. |
| 5,308,811 A | 5/1994 | Suga et al. |
| 5,654,248 A | 8/1997 | Kioka et al. |
| 5,830,820 A | 11/1998 | Yano et al. |
| 5,928,982 A | 7/1999 | Suga et al. |
| 5,973,084 A | 10/1999 | Suga et al. |
| 6,040,261 A | 3/2000 | Hlatky |
| 6,048,817 A | 4/2000 | Sagae et al. |
| 6,103,657 A | 8/2000 | Murray |
| 6,147,173 A | 11/2000 | Holtcamp |
| 6,175,409 B1 | 1/2001 | Nielsen et al. ............... 356/337 |
| 6,211,105 B1 | 4/2001 | Holtcamp |
| 6,239,062 B1 | 5/2001 | Cribbs |
| 6,260,407 B1 | 7/2001 | Petro et al. .................... 73/61.5 |
| 6,274,684 B1 | 8/2001 | Loveday et al. |
| 6,294,388 B1 | 9/2001 | Petro ................................ 436/8 |
| 6,306,658 B1 | 10/2001 | Turner et al. ................... 436/37 |

(Continued)

FOREIGN PATENT DOCUMENTS

| | | |
|---|---|---|
| CN | 101503487 | 8/2009 |
| EP | 0511665 | 11/1992 |

(Continued)

OTHER PUBLICATIONS

LaPointe et al., "New Family of Weakly Coordinating Anions," Journal of the American Chemical Society, 2000, vol. 122, No. 39, pp. 9560-9561.
Kehr et al., "(N-Pyrrolyl)B(C6F5)2—A New Organometallic Lewis Acid for the Generation of Group 4 Metallocene Cation Complexes," Chemical European Journal, 2000, vol. 6, No. 2, pp. 258-266.
Nam et al., "Propene Polymerization with Stereospecific Metallocene Dichloride-[Ph3C] [B(C6F5)4] Using [omega]-Alkenylaluminum as an Alkylation Reagent and as a Functional Comonomer," Macromolecules, 2002, vol. 35, No. 18, pp. 6760-6762.
Tanaka et al., "Pseudo-living copolymerization of norbornene and ω-alkenylborane—Synthesis of monodisperse functionalized cycloolefin copolymer," Polymer, 2015, vol. 56, pp. 218-222.
U.S. Appl. No. 61/779,435, filed Mar. 13, 2013 Holtcamp et al.
U.S. Appl. No. 62/149,799, filed Apr. 20, 2015 Ye et al.
U.S. Appl. No. 62/149,814, filed Apr. 20, 2015 Ye et al.

(Continued)

*Primary Examiner* — Caixia Lu
(74) *Attorney, Agent, or Firm* — Catherine L. Bell

(57) ABSTRACT

This invention relates to organoaluminum compounds, organoaluminum activator systems, preferably supported, to polymerization catalyst systems containing these activator systems, and to polymerization processes utilizing the same. In particular, this invention relates to catalyst systems comprising ion-exchange layered silicate, a catalyst compound, an activator and an aluminum compound represented by formula: $Al(R')_{3-v}(R'')_v$, wherein each R', independently, is a $C_1$-$C_{30}$ hydrocarbyl group; each R'', independently, is a $C_4$-$C_{20}$ hydrocarbenyl group; and v is from 0.1 to 3.

47 Claims, No Drawings

(56) References Cited

U.S. PATENT DOCUMENTS

| | | | |
|---|---|---|---|
| 6,333,423 B1 | 12/2001 | Kol et al. | |
| 6,353,063 B1 | 3/2002 | Shimizu et al. | |
| 6,368,999 B1 | 4/2002 | Speca | |
| 6,376,416 B1 | 4/2002 | Hirakawa et al. | |
| 6,376,629 B2 | 4/2002 | Nagy et al. | |
| 6,399,535 B1 | 6/2002 | Shih et al. | |
| 6,406,632 B1 | 6/2002 | Safir et al. | 210/656 |
| 6,414,162 B1 | 7/2002 | Nagy | |
| 6,436,292 B1 | 8/2002 | Petro | 210/656 |
| 6,451,724 B1 | 9/2002 | Nifant'ev et al. | |
| 6,454,947 B1 | 9/2002 | Safir et al. | 210/656 |
| 6,455,316 B1 | 9/2002 | Turner et al. | 436/37 |
| 6,461,515 B1 | 10/2002 | Safir et al. | 210/656 |
| 6,475,391 B2 | 11/2002 | Safir et al. | 210/656 |
| 6,489,168 B1 | 12/2002 | Wang et al. | 436/37 |
| 6,489,480 B2 | 12/2002 | Rodriguez | |
| 6,491,816 B2 | 12/2002 | Petro | 210/198 |
| 6,491,823 B1 | 12/2002 | Safir et al. | 210/656 |
| 6,531,552 B2 | 3/2003 | Nakano et al. | |
| 6,559,090 B1 | 5/2003 | Shih et al. | |
| 6,596,827 B2 | 7/2003 | Kol et al. | |
| 6,664,348 B2 | 12/2003 | Speca | |
| 6,734,131 B2 | 5/2004 | Shih et al. | |
| 6,844,389 B2 | 1/2005 | Mehta et al. | |
| 6,900,321 B2 | 5/2005 | Boussie et al. | |
| 6,943,224 B2 | 9/2005 | Shih | |
| 6,953,764 B2 | 10/2005 | Frazier et al. | |
| 7,183,348 B2 | 2/2007 | Reinking et al. | |
| 7,220,695 B2 | 5/2007 | Casty et al. | |
| 7,273,914 B2 | 9/2007 | Wang et al. | |
| 7,355,058 B2 | 4/2008 | Luo et al. | |
| 7,385,015 B2 | 6/2008 | Holtcamp | |
| 7,754,840 B2 | 7/2010 | Loveday et al. | |
| 7,973,116 B2 | 7/2011 | Hagadorn et al. | |
| 8,071,701 B2 | 12/2011 | Klosin et al. | |
| 8,080,613 B2 | 12/2011 | Moad et al. | |
| 8,110,518 B2 | 2/2012 | Marin et al. | |
| 8,394,902 B2 | 3/2013 | Hagadorn et al. | |
| 8,575,284 B2 | 11/2013 | Luo et al. | |
| 8,674,040 B2 | 3/2014 | Hagadorn et al. | |
| 8,710,163 B2 | 4/2014 | Hagadorn et al. | |
| 8,791,217 B2 | 7/2014 | Hlavinka et al. | |
| 8,907,032 B2 | 12/2014 | Kol et al. | |
| 8,937,137 B2 | 1/2015 | Holtcamp et al. | |
| 8,952,114 B2 | 2/2015 | Giesbrecht et al. | |
| 8,957,171 B2 | 2/2015 | Giesbrecht et al. | |
| 8,957,172 B2 | 2/2015 | Giesbrecht et al. | |
| 9,079,991 B2 | 7/2015 | Ker et al. | |
| 9,120,879 B2 | 9/2015 | Giesbrecht et al. | |
| 9,150,676 B2 | 10/2015 | Kol et al. | |
| 9,193,813 B2 | 11/2015 | Kol et al. | |
| 9,200,099 B2 | 12/2015 | Kol et al. | |
| 9,200,100 B2 | 12/2015 | Kol et al. | |
| 9,249,238 B2 | 2/2016 | Hagadorn et al. | |
| 9,260,552 B2 | 2/2016 | Hagadorn et al. | |
| 9,290,589 B2 | 3/2016 | Evans et al. | |
| 9,315,593 B2 | 4/2016 | Hagadorn | |
| 9,315,602 B2 | 4/2016 | Yamashita et al. | |
| 9,321,858 B2 | 4/2016 | Hagadorn et al. | |
| 10,465,018 B2 | 11/2019 | Duchateau et al. | C08F 2/38 |
| 2002/0019503 A1 | 2/2002 | Kol et al. | |
| 2002/0038036 A1 | 3/2002 | Resconi et al. | |
| 2002/0123582 A1 | 9/2002 | Speca | |
| 2002/0142912 A1 | 10/2002 | Boussie et al. | |
| 2003/0027950 A1 | 2/2003 | Uchino et al. | |
| 2003/0096698 A1 | 5/2003 | Shih et al. | |
| 2003/0104928 A1 | 6/2003 | Holtcamp | |
| 2003/0213938 A1 | 11/2003 | Farley et al. | |
| 2005/0148743 A1 | 7/2005 | Casty et al. | |
| 2005/0245701 A1 | 11/2005 | Oshima et al. | |
| 2005/0267273 A1 | 12/2005 | Kashiwa et al. | |
| 2006/0155083 A1 | 7/2006 | Nakayama et al. | |
| 2006/0293470 A1 | 12/2006 | Cao et al. | |
| 2007/0185343 A1 | 8/2007 | Verpoort et al. | |
| 2010/0227990 A1 | 9/2010 | Kuhlman et al. | |
| 2011/0077369 A1 | 3/2011 | Yukita | |
| 2011/0082323 A1 | 4/2011 | Small et al. | |
| 2011/0092651 A1 | 4/2011 | Arriola et al. | |
| 2013/0035463 A1 | 2/2013 | Cann et al. | |
| 2013/0131294 A1 | 5/2013 | Hagadorn et al. | |
| 2013/0172498 A1 | 7/2013 | Hlavinka et al. | |
| 2013/0289227 A1 | 10/2013 | Jensen et al. | |
| 2014/0031504 A1 | 1/2014 | Jacobsen et al. | |
| 2014/0039137 A1 | 2/2014 | Giesbrecht et al. | |
| 2014/0039138 A1 | 2/2014 | Giesbrecht et al. | |
| 2014/0039139 A1 | 2/2014 | Giesbrecht et al. | |
| 2014/0121341 A1 | 5/2014 | Holtcamp et al. | |
| 2014/0128557 A1 | 5/2014 | Giesbrecht et al. | |
| 2014/0221587 A1 | 8/2014 | Hagadorn et al. | |
| 2014/0275454 A1 | 9/2014 | Holtcamp et al. | |
| 2014/0378720 A1 | 12/2014 | Wu et al. | |
| 2015/0025205 A1 | 1/2015 | Yang et al. | |
| 2015/0119540 A1 | 4/2015 | Holtcamp et al. | |
| 2015/0141601 A1 | 5/2015 | Hagadorn et al. | |
| 2015/0329652 A1 | 11/2015 | Hlavinka | |
| 2017/0088641 A1 | 3/2017 | Holtcamp et al. | |
| 2017/0096506 A1 | 4/2017 | Ye et al. | |
| 2017/0096507 A1 | 4/2017 | Atienza et al. | |
| 2017/0096508 A1 | 4/2017 | Ye et al. | |
| 2017/0096509 A1 | 4/2017 | Atienza et al. | |
| 2017/0096510 A1 | 4/2017 | Ye et al. | |
| 2017/0096511 A1 | 4/2017 | Atienza et al. | |
| 2017/0355787 A1 | 12/2017 | Duchateau et al. | C08F 2/38 |
| 2018/0002352 A1 | 1/2018 | Hagadorn et al. | C01F 7/00 |
| 2018/0134816 A1 | 5/2018 | Canich et al. | C08F 4/649 |
| 2018/0134827 A1 | 5/2018 | Hagadorn et al. | C08F 210/06 |
| 2018/0201698 A1 | 7/2018 | Hagadorn et al. | C08F 4/659 |
| 2018/0251586 A1 | 7/2018 | Hagadorn et al. | C08F 4/659 |
| 2018/0244817 A1 | 8/2018 | Hagadorn et al. | C08F 210/02 |

FOREIGN PATENT DOCUMENTS

| | | | |
|---|---|---|---|
| EP | 1160261 | 12/2001 | |
| EP | 0 849 292 | 8/2002 | |
| EP | 2436703 | 4/2012 | |
| GB | 1002430 | 8/1965 | |
| GB | 1278516 | 6/1972 | |
| JP | H05025214 | 2/1993 | |
| JP | 1995033814 | 2/1995 | |
| JP | H11166011 | 6/1999 | |
| JP | H11166012 | 6/1999 | |
| JP | H11255816 | 9/1999 | |
| JP | 2000072813 | 3/2000 | |
| JP | 2000198812 | 7/2000 | |
| JP | 2001026613 | 1/2001 | |
| JP | 2001031720 | 2/2001 | |
| JP | 2001163908 | 6/2001 | |
| JP | 2001163909 | 6/2001 | |
| JP | 2001200010 | 7/2001 | |
| JP | 2001316414 | 11/2001 | |
| JP | 2001316415 | 11/2001 | |
| JP | 2002020415 | 1/2002 | |
| JP | 2002037812 | 2/2002 | |
| JP | 2002060411 | 2/2002 | |
| JP | 2002060412 | 2/2002 | |
| JP | 2002069116 | 3/2002 | |
| JP | 2004083773 | 3/2004 | |
| JP | 3891905 | 3/2007 | |
| JP | 3943959 | 7/2007 | |
| JP | 2007254575 | 10/2007 | |
| JP | 2007261211 | 10/2007 | |
| JP | 2007262330 | 10/2007 | |
| JP | 2007262335 | 10/2007 | |
| JP | 2007262336 | 10/2007 | |
| JP | 2007262338 | 10/2007 | |
| JP | 2007262631 | 10/2007 | |
| JP | 4615248 | 1/2011 | |
| JP | 2011089019 | 5/2011 | |
| JP | 2013124302 | 6/2013 | |
| KR | 2009017896 | * 2/2009 | |
| KR | 101381879 | 11/2012 | |
| KR | 2012120640 | * 11/2012 | |
| WO | 97/48743 | 12/1997 | |
| WO | WO2000/009255 | 2/2000 | B01J 19/00 |

(56) References Cited

FOREIGN PATENT DOCUMENTS

| WO | 00/011044 | 3/2000 | |
|---|---|---|---|
| WO | 00/22010 | 4/2000 | |
| WO | 01/23442 | 4/2001 | |
| WO | 01/30864 | 5/2001 | |
| WO | 01/42320 | 6/2001 | |
| WO | 2002/038628 | 5/2002 | |
| WO | 02/088198 | 11/2002 | |
| WO | 02/102811 | 12/2002 | |
| WO | 03/064433 | 8/2003 | |
| WO | 03/064435 | 8/2003 | |
| WO | 2004/106390 | 12/2004 | |
| WO | 2005/075525 | 8/2005 | |
| WO | 2005/095469 | 10/2005 | |
| WO | 2006/036748 | 4/2006 | |
| WO | 2007/018804 | 2/2007 | |
| WO | 2007/035492 | 3/2007 | |
| WO | 2007/067965 | 6/2007 | |
| WO | 2010/037059 | 4/2010 | |
| WO | 2011/014533 | 2/2011 | |
| WO | 2012/009369 | 1/2012 | |
| WO | 2012/033670 | 3/2012 | |
| WO | 2012/098521 | 7/2012 | |
| WO | 2012/134614 | 10/2012 | |
| WO | 2012/134615 | 10/2012 | |
| WO | 2012/158260 | 11/2012 | |
| WO | 2013/028283 | 2/2013 | |
| WO | 2013/040276 | 3/2013 | |
| WO | 2014/137927 | 9/2014 | |
| WO | 2014/143202 | 9/2014 | |
| WO | 2014/149361 | 9/2014 | |
| WO | 2015/088819 | 6/2015 | |
| WO | 2017/039994 | 3/2017 | |
| WO | 2017/039995 | 3/2017 | |
| WO | WO2018/022238 | 2/2018 | ............... C08F 4/64 |

OTHER PUBLICATIONS

U.S. Appl. No. 62/168,302, filed May 29, 2015 Holtcamp et al.
U.S. Appl. No. 62/236,691, filed Oct. 2, 2015 Ye et al.
U.S. Appl. No. 62/236,697, filed Oct. 2, 2015 Ye et al.
U.S. Appl. No. 62/236,701, filed Oct. 2, 2015 Atienza et al.
U.S. Appl. No. 62/236,712, filed Oct. 2, 2015 Atienza et al.
U.S. Appl. No. 62/236,720, filed Oct. 2, 2015 Atienza et al.
U.S. Appl. No. 62/236,727, filed Oct. 2, 2015 Ye et al.
U.S. Appl. No. 15/051,421, filed Feb. 23, 2016 Atienza et al.
Barroso et al., "Chiral Diamine Bis(phenolate) TiIV and ZrIV Complexes—Synthesis, Structures and Reactivity," Eur. J. Inorg. Chem., 2011, pp. 4277-4290.
Bucheli et al., "Spherical Clay Conglomerates: A Novel Stationary Phase for Solid-Phase Extraction and 'Reversed-Phase' Liquid Chromatography," Analytical Chemistry, vol. 71(11), Jun. 1, 1999, pp. 2171-2178.
Busico et al., "Block Copolymers of Highly Isotactic Polypropylene via Controlled Ziegler-Natta Polymerization," Macromolecules, 2004, vol. 37, pp. 8201-8203.
Cipullo et al., "Improving the Behavior of Bis(phenoxyarnine) Group 4 Metal Catalysts for Controlled Alkene Polymerization," Macromolecules, 2009, vol. 42, pp. 3869-3872.
Gibson et al., "Advances in Non-Metallocene Olefin Polymerization Catalysis," Chem. Rev. 2003, vol. 103, pp. 283-315.
Groysman et al., "From THF to Furan: Activity Tuning and Mechanistic Insight via Sidearm Donor Replacement in Group IV Amine Bis(phenolate) Polymerization Catalysts," Organometallics, 2003, vol. 22, pp. 3013-3015.
Groysman et al., "Diverse Structure-Activity Trends in Amine Bis(phenolate) Titanium Polymerization Catalysts," Organometallics, 2004, vol. 23, pp. 5291-5299.

Van Meurs et al., "Polyethylene Chain Growth on Zinc Catalyzed by Olefine Polymerization Catalysts: A Comparative Investigation of Highly Active Catalyst Systems across the Transition Series," J. Am. Chem. Soc., 2005, vol. 127, pp. 9913-9923.
Reybuck et al., "Amine Bis(phenolate) Zirconium Complexes: Influence of Ligand Structure and Cocatalyst on Copolymerization Behaivor," Macromolecules, 2005, vol. 38, pp. 2552-2558.
Su et al., "Oxo-Bridged Bimetallic Group 4 Complexes Bearing Amine-Bis(benzotriazole phenolate) Derivatives as Bifunctional Catalysts for Ring-Opening Polymerization of Lactide and Copolymerization of Carbon Dioxide with Cyclohexene Oxide," Organometallics, 2014, vol. 33, pp. 7091-7100.
Tshuva et al., "[ONXO]-Type Amine Bis(phenolate) Zirconium and Hafnium Complexes as Extremely Active 1-Hexene Polymerization Catalysts," Organometallics, 2002, vol. 21, pp. 662-670.
Valente et al., "Coordinative Chain Transfer Polymerization," Chemical Reviews, 2013, vol. 113, pp. 3836-3857.
Dolzine et al., "Intramolecular metal—double bond interactions : VII. Intramolecular cyclization of alkenyl derivatives of lithium, aluminum, gallium and indium", Journal of Organometallic Chemistry, 1974, vol. 78, No. 2, pp. 165-176.
U.S. Appl. No. 62/332,940, filed May 6, 2016 Holtcamp et al.
PCT/US2017/055131 filed Oct. 4, 2017 Hule et al.
U.S. Appl. No. 62/410,173, filed Oct. 19, 2016 Hule et al.
Warwel et al., "Thermische Strukturisomerisierung der Additionsprodukte von HAI(iso-C4H9)2 an 1,4-Pentadiene," Justus Liebigs Annalen der Chemie, vol. 1975, issue 4; pp. 642-649.
Hata, "Aluminium-Olefinic Double Bond Interaction in Alkeynlaluminium Compounds," Chemical Communications, 1968, vol. 1, pp. 7-9.
Shiono et al., "Isospecific Polymerization of Propene over TiCl3 Combined with Bis(.omega.-alkenyl)zinc Compounds," Macromolecules, 1995, vol. 28, No. 2; pp. 437-443.
Weng et al., "Long Chain Branched Isotactic Polypropylene," Macromolecules, 2002, vol. 35, No. 10, pp. 3838-3843.
Dekmezian et al., "Characterization and Modeling of Metallocene-Based Branch-Block Copolymers," Macromolecules, 2002, vol. 35, No. 25, pp. 9586-9594.
Vaughan et al., "Industrial Catalysts for Alkene Polymerization," Polymer Science: A Comprehensive Reference, vol. 3; 3.20, pp. 657-672.
Britovsek et al., "The Search for New-Generation Olefin Polymerization Catalysts: Life beyond Metallocenes," Angew. Chem. Int. Ed., 1999, vol. 38, vol. 4, pp. 428-447.
Froese et al., "Mechanism of Activation of a Hafnium Pyridyl—Amide Olefin Polymerization Catalyst: Ligand Modification by Monomer," Journal of the American Chemical Society, 2007, vol. 129, No. 25, pp. 7831-7840.
Guerin et al., "Conformationally Rigid Diamide Complexes of Zirconium: Electron Deficient Analogues of Cp2Zr," Organometallics, 1996, vol. 15, No. 26, pp. 5586-5590.
AkzoNobel, Product Data Sheet—Isoprenyl, Dec. 1, 2014, http://www.pcpds.akzonobel.com/PolymerChemicalsPDS/showPDF.aspx?pds_id=1348, 2 pgs.
Boussie, T. et al. (2003) "A Fully Integrated High-Throughput Screening Methodology for the Discovery of New Polyolefin Catalysts: Discovery of a New Class of High Temperature Single-Site Group (IV) Copolymerizations Catalysts," *Jrnl. Amer. Chem. Soc.*, v.125, pp. 4306-1371.
Shiono, T. et al. (2013) "Facile Synthesis of Hydroxy-Functionalized Cycloolefin Copolymer using ω-Alkenylaluminium as a Comonomer,"*Macromol. Chem. Phys.*, v.214, pp. 2239-2244.ω
Tanaka, et al. (2015) "Pseudo-Living Copolymerization of Norbornene and (ω-Alkenylborane—Synthesis of Monodisperse Functionalized Cycloolefin Copolymer," *Polymer*, v.56, pp. 218-222.

\* cited by examiner

ALUMINUM ALKYLS WITH PENDANT OLEFINS ON CLAYS

PRIORITY AND CROSS REFERENCE TO RELATED APPLICATIONS

This application is the § 371 National Stage application for PCT/US2016/046404, filed Aug. 10, 2016, which claims priority to and the benefit of U.S. Ser. No. 62/332,921 filed May 6, 2016, and U.S. Ser. No. 62/212,405,filed Aug. 31, 2015. This application also relates to U.S. Ser. No. 15/744,478, filed Jan. 12, 2018 which claims priority to and the benefit of U.S. Ser. No. 62/332,940, filed May 6, 2016.

FIELD OF THE INVENTION

This invention relates to catalyst systems comprising an ion-exchange layered silicate, a catalyst compound (such as a metallocene) and an aluminum vinyl transfer agent.

BACKGROUND OF THE INVENTION

Metallocene olefin polymerization catalyst systems typically use an activator (also called a co-catalyst) to generate the active catalytic species. In general, there are two catalyst activator families: partially hydrolyzed aluminum alkyl complexes and non-coordinating anions (NCA's). Some of the most commonly employed activators used today are the partially hydrolyzed aluminum alkyls, more specifically, alumoxanes, such as methylalumoxane (MAO). In general, metallocene olefin polymerization systems that utilize NCA-type activators are more active than their MAO counterparts, but are also quite costly and much more sensitive to poisons which present a problem in catalyst synthesis, handling, storage and reactor operation. Alternatively, MAO-based systems are more robust than their NCA-type counterparts, but they suffer from the high cost of MAO production, the fact that MAO is typically used in large excess (relative to the amount of metallocene) and the limited shelf life of MAO.

In order to enhance polymer morphology, metallocene polymerization catalysts operated in industrial slurry and gas phase processes are typically immobilized on a carrier or a support, such as alumina or silica. Metallocenes are supported to enhance the morphology of the forming polymeric particles such that they achieve a shape and density that improves reactor operability and ease of handling. However, the supported versions of metallocene polymerization catalysts tend to have lower activity as compared to their homogeneous counterparts. In general, metallocene and single-site catalysts are immobilized on silica supports.

Alternative supports for metallocene and single-site catalysts have been the subject of numerous ongoing research projects. In particular, metallocenes supported on clay or ion-exchanged layered compounds have generated interest. Olefin polymerization catalysts using clay, clay mineral or acid/salt-treated (or a combination of both) ion-exchange layered compounds, an organoaluminum compound and a metallocene as components have been reported (see EP 0 511 665; EP 0 511 665; and U.S. Pat. No. 5,308,811). Likewise, U.S. Pat. No. 5,928,982 and 5,973,084 report olefin polymerization catalysts containing an acid or salt-treated (or a combination of both) ion exchange layered silicate, containing less than 1% by weight water, an organoaluminum compound and a metallocene. Furthermore, WO 01/42320 discloses combinations of clay or clay derivatives as a catalyst support, an activator comprising any Group 1-12 metal or Group 13 metalloid, other than organoaluminum compound, and a Group 3-13 metal complex. Also, U.S. Pat. No. 6,531,552 and EP 1 160 261 report an olefin polymerization catalyst of an ion-exchange layered compound having particular acid strength and acid site densities. U.S. 2003/0027950 reports an olefin polymerization catalyst utilizing ion-exchange layered silicates with a specific pore size distribution and having a carrier strength within a specific range.

Likewise, alternative activators for metallocenes and other single-site polymerization catalysts have been the subject of numerous research efforts in recent years. For example, perfluorophenyl aluminum and borane complexes containing one anionic nitrogen-containing group may activate metallocenes. For example, R. E. Lapointe, G. R. Roof, K. A. Abboud, J. Klosin, J. Am. Chem. Soc. 2000, 122, 9560-9561, and WO 01/23442 A1 report the synthesis of $(C_6F_5)_3Al(imidazole)[Al(C_6F_5)_3][HNR'R'']$. In addition, G. Kehr, R. Frohlich, B Wibbeling, G. Erker, Chem. Eur. J., 2000, 6, No. 2, 258-266 report the synthesis of (N-Pyrrolyl)$B(C_6F_5)_2$. Supported activators containing a Group 13 element and at least one halogenated, nitrogen-containing aromatic group ligand for polymerization catalysts have been reported (U.S. Pat. Nos. 6,147,173 and 6,211,105).

Macromolecules 2002, 35, 6760-6762 discloses propene polymerization with tetrakis(pentafluorophenyl)borate, 7-octenyldiisobutylaluminum, and racMe$_2$Si(2-Me-indenyl)$_2$ZrCl$_2$ or Ph$_2$C(cyclopentadienyl)(fluorenyl)ZrCl$_2$ to produce polypropylene with octenyldiisobutylaluminum incorporated as a comonomer.

Other references of interest include: US 2003/104928; WO 2003/064433; U.S. Pat. No. 6,489,480; U.S. 2002/038036; WO 2002/102811; U.S. Pat. Nos. 6,414,162; 6,040,261; 6,239,062; 6,376,629; 6,451,724; JP 2002-069116A; JP 2002-0253486A; US 2003/0027950; JP 2002-037812A; JP 2002-020415A; JP 2002-060411A; JP 2001-316415A; JP 2001-316414A; U.S. Pat. No. 6,531,552; JP 2001-200010A; JP 2001-163909A; JP 2001163908A; WO 2001/30864; JP 2001-026613A; JP 2001-031720A; JP 2000-198812A; WO 2000/22010; JP 2000072813A; WO 2000/11044; U.S. Pat. Nos. 6,353,063; 6,376,416; JP 11255816A(1999 Sep. 21); JP 11166012A(1999 Jun. 22); JP 11166011A(1999 Jun. 22); U.S. Pat. No. 6,048,817; JP 05025214A(1993 Feb. 02); WO 2003/064433; WO 2003/0644435; JP 2004-83773; U.S. 2007/0185343; U.S. 2005/0267273; U.S. 2005/0245701; U.S. 2013/0289227; U.S. Pat. Nos. 4,874,734; 5,122,491; 5,155,078; 5,234,878; 5,654,248; US 2006/0155083; Polymer 56 (2015) 218-222; JP 2004-83773; and WO 2007/035492.

Given the high cost, low stability and reduced activity of MAO-based metallocene polymerization systems, there is a need in the art for new inexpensive, stable and supportable polymerization catalyst activator compounds.

SUMMARY OF THE INVENTION

This invention relates to supported activators comprising the product of the combination of an ion-exchange layered silicate, an aluminum vinyl transfer agent (AVTA), and an olefin polymerization catalyst compound (such as a metallocene or other single-site transition metal catalyst compound). This invention further relates to catalyst systems comprising an olefin polymerization catalyst compound (such as a metallocene or other single-site transition metal catalyst compound) and such activators, as well as processes to polymerize unsaturated monomers using the supported activators.

This invention further relates to catalyst systems comprising clay, transition metal catalyst complex, and aluminum vinyl transfer agent composition represented by formula:

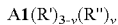

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3.

This invention also relates to aluminum vinyl transfer agents which are organoaluminum compounds which are the reaction product(s) of alkyl dienes and trialkyl aluminums. The alkyl diene and the aluminum alkyl are combined and heated to produce the organoaluminum compound(s), which is useful as an activator or a scavenger when utilized with an olefin polymerization catalysts (such as a metallocene or other single-site transition metal catalysts) to prepare polymers, such as polypropylene.

DETAILED DESCRIPTION

This invention relates to supported activators (or scavengers) comprising the product of the combination of an ion-exchange layered silicate, an aluminum vinyl transfer agent and, optionally, an olefin polymerization catalyst compound (such as a metallocene or other single-site transition metal catalyst).

In another embodiment, an aluminum vinyl transfer agent and an olefin polymerization catalyst compound (such as a metallocene or other single-site transition metal catalyst) are combined to provide a catalyst system.

For the purposes of this patent specification and the claims thereto, the term "activator" is used interchangeably with the term "co-catalyst," the term "catalyst" refers to a metal compound that when combined with an activator polymerizes olefins, and the term "catalyst system" refers to the combination of a catalyst and an activator with a support. The terms "support" or "carrier," for purposes of this patent specification, are used interchangeably and are any ion-exchange layered silicates.

When "catalyst system" is used to describe such the catalyst compound/activator combination before activation, it means the unactivated catalyst complex (pre-catalyst) together with an activator and, optionally, a co-activator. When it is used to describe the combination after activation, it means the activated complex and the activator or other charge-balancing moiety. The transition metal compound may be neutral as in a pre-catalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, pre-catalyst compound, catalyst compound, transition metal complex, or transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

As used herein, the new notation for the Periodic Table Groups is used as described in Chemical and Engineering News, 63(5), 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene and or propylene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. An ethylene polymer (or ethylene copolymer) is a polymer having at least 50 mol % of ethylene, a propylene polymer (or propylene copolymer) is a polymer having at least 50 mol % of propylene, and so on. For the purposes of this invention, ethylene shall be considered an α-olefin.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity index (PDI), is defined to be $M_w$ divided by $M_n$. Unless otherwise noted, all molecular weight units (e.g., $M_w$, $M_n$, $M_z$) are g/mol.

Unless otherwise noted all melting points (Tm) are DSC second melt.

The term "continuous" means a system that operates without interruption or cessation. For example, a continuous process to produce a polymer would be one where the reactants are continually introduced into one or more reactors and polymer product is continually withdrawn.

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bz is benzyl, MAO is methylalumoxane, Ind is indenyl, Cp is cyclopentadienyl, Flu is fluorenyl, and TnOAl is tri-n-octyl aluminum.

The terms "hydrocarbyl radical," "hydrocarbyl," "hydrocarbyl group," and "hydrocarbyl radical" are used interchangeably throughout this document. Likewise, the terms "group", "radical", and "substituent" are also used interchangeably in this document. For purposes of this disclosure, "hydrocarbyl radical" is defined to be C1-C100 radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, Cl, F, or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

An alkyl diene is an alpha-omega diene of formula $H_2C=CH(CR^b{}_2)_pHC=CH_2$ where p is an integer from 0-16, and each $R^b$ is independently hydrogen or a $C_1$-$C_{10}$ alkyl. Preferably, each $R^b$ is hydrogen. Examples include 1,3-butadiene, 1,4-pentadiene, 1,5-hexadiene, 1,6-heptadiene, 1,7-octadiene and the like.

The term "hydrocarbeneyl" refers to a hydrocarb-di-yl divalent group, such as a $C_1$ to $C_{20}$ alkylene (i.e., methylene ($CH_2$), ethylene [$(CH_2)_2$], propandiyl [$(CH_2)_3$], butandiyl [$(CH_2)_4$], pentandiyl [$(CH_2)_5$], hexandiyl [$(CH_2)_6$], heptandiyl [$(CH_2)_7$], octandiyl [$(CH_2)_8$], nonandiyl [$(CH_2)_9$], decandiyl [$(CH_2)_{10}$], undecandiyl [$(CH_2)_{11}$], dodecandiyl [$(CH_2)_{12}$], and isomers thereof).

Linear Mono-Olefins

Any linear mono-olefin may be used for the polymerization reactions described herein. For example, an alpha olefin may be used. For the purposes of this invention and the claims thereto, the term "alpha olefin" refers to an olefin where the carbon—carbon double bond occurs between the alpha and beta carbons of the chain. Alpha olefins may be represented by the formula: $H_2C=CH—R*$, wherein each $R*$ is independently, hydrogen or a $C_1$ to $C_{30}$ hydrocarbyl; preferably, a $C_2$ to $C_{20}$ hydrocarbyl; preferably, a $C_3$ to $C_{12}$ hydrocarbyl; preferably, methyl, ethyl, propyl, butyl, pentyl, heptyl, octyl, nonyl, decyl, undecyl, dodecyl, and substituted analogs thereof. For example, ethylene, propylene, 1-butene, 1-pentene, 1-hexene, 1-heptene, 1-octene, 1-nonene, and 1-decene are alpha olefins that are particularly useful in embodiments herein.

The linear mono-olefin may also be substituted at any position along the carbon chain with one or more substituents. Suitable substituents include, without limitation, alkyl, preferably, $C_{1-6}$ alkyl; cycloalkyl, preferably, $C_{3-6}$ cycloalkyl; as well as hydroxy, ether, keto, aldehyde, and halogen functionalities.

Preferred linear mono-olefins include, ethylene, propylene, butene, pentene, hexene, octene, nonene, decene undecene, dodecene, and the isomers thereof (particularly the isomers where the double bond is in the alpha position (vinyl).

Particularly preferred linear mono-olefins include 1-butene, 1-pentene, 1-hexene, 1-decene, and 1-octene.

Alkyl Aluminum Compounds

Alkyl aluminum compounds, typically useful as co-activators or scavengers herein, are represented by the formula:

$$AlR^a{}_3 \qquad (I)$$

wherein each $R^a$ is independently, a hydrogen atom or a substituted or unsubstituted alkyl group and/or a substituted or unsubstituted aryl group. Optionally, one or more $R^a$ groups can be a hydrogen atom. In one aspect, one or more $R^a$ groups is an alkyl group containing 1 to 30 carbon atoms. Suitable $R^a$ groups include methyl, ethyl, propyl, butyl, isobutyl, pentyl, hexyl, heptyl, octyl, nonyl, decyl, undecyl, docecyl, aryl, and all isomers thereof. Trialkylaluminum compounds and dialkylaluminumhydride compounds are suitable examples. In some embodiments, the alkyl aluminum compound is referred to as an aluminum reagent.

Aluminum Vinyl Transfer Agents

The catalyst systems described herein comprise an aluminum vinyl-transfer agent, also referred to as an AVTA, (which is any aluminum agent that contains at least one transferrable group that has an allyl chain end). An allyl chain end is represented by the formula $H_2C=CH—CH_2—$. "Allylic vinyl group," "allyl chain end," "vinyl chain end," "vinyl termination," "allylic vinyl group," "terminal vinyl group," and "vinyl terminated" are used interchangeably herein and refer to an allyl chain end. An allyl chain end is not a vinylidene chain end or a vinylene chain end. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer.

Useful transferable groups containing an allyl chain end are represented by the formula $CH_2=CH—CH_2—R$, where $R$ represents a hydrocarbeneyl group or a substituted hydrocarbeneyl group, such as a $C_1$ to $C_{20}$ alkylene, preferably methylene ($CH_2$), ethylene [$(CH_2)_2$], propandiyl [$(CH_2)_2$], butandiyl [$(CH_2)_4$], pentandiyl [$(CH_2)_5$], hexandiyl [$(CH_2)_6$], heptandiyl [$(CH_2)_7$], octandiyl [$(CH_2)_8$], nonandiyl [$(CH_2)_9$], decandiyl [$(CH_2)_{10}$], undecandiyl [$(CH_{20})_{11}$], dodecandiyl [$(CH_2)_{12}$], or an isomer thereof. Useful transferable groups are preferably non-substituted linear hydrocarbeneyl groups.

In an embodiment, at least one $R**$ is a $C_4$-$C_{20}$ hydrocarbenyl group.

In the catalyst system described herein, the catalyst undergoes alkyl group transfer with the aluminum vinyl transfer agent, which enables the formation of polymer chains containing one or more allyl chain ends.

AVTA's are alkenylaluminum reagents capable of causing group exchange between the transition metal of the catalyst system ($M^{TM}$) and the metal of the AVTA ($M^{AVTA}$). Dependent on the catalyst system used, the reverse reaction may also occur such that the polymeryl chain is transferred back to the transition metal of the catalyst system. This reaction scheme is illustrated below:

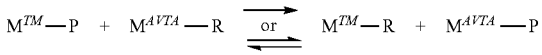

wherein $M^{TM}$ is an active transition metal catalyst site and P is the polymeryl chain, $M^{AVTA}$ is the metal of the AVTA, and R is a transferable group containing an allyl chain end, such as a hydrocarbyl group containing an allyl chain end, also called a hydrocarbenyl or alkenyl group.

In any embodiment of the invention described herein, the catalyst system comprises an aluminum vinyl transfer agent composition, which is typically represented by the formula (I):

$$Al(R')_{3-v}(R'')_v$$

where R" is a hydrocarbenyl group containing 4 to 20 carbon atoms having an allyl chain end, R' is a hydrocarbyl group containing 1 to 30 carbon atoms, and v is 0.1 to 3, alternately v is 0.5 to 2.9, 1.1 to 2.9, alternately 1.5 to 2.7, alternately 1.5 to 2.5, alternately 1.8 to 2.2. The compounds represented by the formula Al(R')$_{3-v}$(R")$_v$ are typically a neutral species, but anionic formulations may be envisioned, such as those represented by formula (II): [Al(R')$_{4-w}$(R")$_w$]$^{31}$, where w is 0.1 to 4, alternately 1.1 to 4, R" is a hydrocarbenyl group containing 4 to 20 carbon atoms having an allyl chain end, and R' is a hydrocarbyl group containing 1 to 30 carbon atoms.

In any embodiment of any formula for an aluminum vinyl transfer agent, such as formula I or II, described herein, each R is independently chosen from $C_1$ to $C_{30}$ hydrocarbyl groups (such as a $C_1$ to $C_{20}$ alkyl groups, preferably methyl, ethyl, propyl, butyl, pentyl, hexyl, heptyl, octyl, nonyl, decyl, undecyl, dodecyl, or an isomer thereof), and R" is represented by the formula:

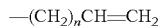
—(CH$_2$)$_n$CH=CH$_2$ where n is an integer from 2 to 18, preferably between 6 to 18, preferably 6 to 12, preferably 6. In any embodiment of the invention described herein, particularly useful AVTAs include, but are not limited to, tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-8-en-1-yl)aluminum, diisobutyl(dodec-10-en-1-yl)aluminum, and the like. Mixtures of one or more AVTAs may also be used. In some embodiments of the invention, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum are preferred.

Useful aluminum vinyl transfer agents include organoaluminum compound reaction products between aluminum reagent (AlR$^a$$_3$) and an alkyl diene. Suitable alkyl dienes include those that have two "alpha olefins", as described above, at two termini of the carbon chain. The alkyl diene can be a straight chain or branched alkyl chain and substituted or unsubstituted. Exemplary alkyl dienes include but are not limited to, for example, 1,3-butadiene, 1,4-pentadiene, 1,5-hexadiene 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-eicosadiene, 1,20-heneicosadiene, etc. Exemplary aluminum reagents include triisobutylaluminum, diisobutylaluminumhydride, isobutylaluminumdihydride and aluminum hydride (AlH$_3$).

In any embodiment of the invention described herein, R" is butenyl, pentenyl, heptenyl, or octenyl. In some embodiments R" is preferably octenyl.

In any embodiment of the invention described herein, R' is methyl, ethyl, propyl, isobutyl, or butyl. In any embodiment of the invention described herein, R' is isobutyl.

In any embodiment of the invention described herein, v is about 2, or v is 2.

In any embodiment of the invention described herein, v is about 1, or v is 1, preferably from about 1 to about 2.

In any embodiment of the invention described herein, v is an integer or a non-integer, preferably v is from 1.1 to 2.9, from about 1.5 to about 2.7, e.g., from about 1.6 to about 2.4, from about 1.7 to about 2.4, from about 1.8 to about 2.2, from about 1.9 to about 2.1 and all ranges there between.

In preferred embodiments of the invention described herein, R' is isobutyl and each R" is octenyl, preferably R' is isobutyl, each R" is octenyl, and v is from 1.1 to 2.9, from about 1.5 to about 2.7, e.g., from about 1.6 to about 2.4, from about 1.7 to about 2.4, from about 1.8 to about 2.2, from about 1.9 to about 2.1.

The amount of v (the aluminum alkenyl) is described using the formulas: (3−v)+v=3, and Al(R')$_{3-v}$(R")$_v$ where R" is a hydrocarbenyl group containing 4 to 20 carbon atoms having an allyl chain end, R is a hydrocarbyl group containing 1 to 30 carbon atoms, and v is 0.1 to 3 (preferably 1.1 to 3). This formulation represents the observed average of organoaluminum species (as determined by $^1$H NMR) present in a mixture, which may include any of Al(R')$_3$, Al(R')2(R"), Al(R')(R")$_2$, and Al(R")$_3$. $^1$H NMR spectroscopic studies are performed at room temperature using a Bruker 400 MHz NMR. Data is collected using samples prepared by dissolving 10-20 mg the compound in 1 mL of $C_6D_6$. Samples are then loaded into 5 mm NMR tubes for data collection. Data is recorded using a maximum pulse width of 45°, 8 seconds between pulses and signal averaging either 8 or 16 transients. The spectra are normalized to protonated tetrachloroethane in the $C_6D_6$. The chemical shifts (δ) are reported as relative to the residual protium in the deuterated solvent at 7.15 ppm.

In still another aspect, the aluminum vinyl-transfer agent composition has less than 50 wt % A dimer present, based upon the weight of the AVTA, preferably less than 40 wt %, preferably less than 30 wt %, preferably less than 20 wt %, preferably less than 15 wt %, preferably less than 10 wt %, preferably less than 5 wt %, preferably less than 2 wt %, preferably less than 1 wt %, preferably 0 wt % A dimer. Alternately dimer is present at from 0.1 to 50 wt %, alternately 1to 20 wt %, alternately at from 2 to 10 wt %. Dimer is the dimeric product of the alkyl diene used in the preparation of the AVTA. The dimer can be formed under certain reaction conditions, and is formed from the insertion of a molecule of diene into the Al-R bond of the AVTA, followed by beta-hydride elimination. For example, if the alkyl diene used is 1,7-octadiene, the dimer is 7-methylenepentadeca-1,14-diene. Similarly, if the alkyl diene is 1,9-decadiene, the dimer is 9-methylenenonadeca-1,18-diene.

Useful compounds can be prepared by combining an aluminum reagent (such as alkyl aluminum) having at least one secondary alkyl moiety (such as triisobutylaluminum) and/or at least one hydride, such as a dialkylaluminum hydride, a monoalkylaluminum dihydride or aluminum trihydride (aluminum hydride, AlH$_3$) with an alkyl diene and heating to a temperature that causes release of an alkylene byproduct. The use of solvent(s) is not required. However, non-polar solvents can be employed, such as, as hexane, pentane, toluene, benzene, xylenes, and the like, or combinations thereof.

In an embodiment of the invention, the AVTA composition is free of coordinating polar solvents such as tetrahydrofuran and diethylether.

After the reaction is complete, solvent if, present can be removed and the product can be used directly without further purification.

The AVTA composition to catalyst complex equivalence ratio can be from about 1:100 to 500,000:1. More preferably, the molar ratio of AVTA to catalyst complex is greater than 5, alternately greater than 10, alternately greater than 15, alternately greater than 20, alternately greater than 25, alternately greater than 30.

Olefin Polymerization Catalyst Compositions

The processes described herein may use any catalyst system capable of polymerizing the monomers disclosed herein if that catalyst system is sufficiently active under the polymerization conditions disclosed herein. Thus, group 3-10 transition metal compounds or lanthanide metal compounds or actinide metal compounds may form suitable catalysts. Exemplary, but not limiting, catalysts include metallocene catalyst compounds. Especially preferred are group 4 metallocenes of (i.e., titanium, hafnium or zirconium) which typically exist during the polymerization in the $d^0$ mono-valent cationic state and bear one or two ancillary ligands. The important features of such catalysts for coordination polymerization is that the pre-catalyst comprises a ligand capable of abstraction and another ligand into which ethylene (or other olefin) can be inserted.

Representative metallocene-type compounds useful herein are represented by the formula:

$$T_j L^A L^B L^C_i MDE$$

where, M is a group 3, 4, 5, or 6 transition metal atom, or a lanthanide metal atom, or actinide metal atom, preferably a group 4 transition metal atom selected from titanium, zirconium or hafnium; $L^A$, an ancillary ligand, is a substituted or unsubstituted monocyclic or polycyclic arenyl pi-bonded to M; $L^B$ is a member of the class of ancillary ligands defined for $L^A$, or is J, a hetero-atom ancillary ligand bonded to M through the heteroatom; the $L^A$ and $L^B$ ligands may be covalently bridged together through a bridging group, T, containing a group 14, 15 or 16 element or boron wherein j is 1 if T is present and j is 0 if T is absent (j equals 0 or 1); $L^C_i$ is an optional neutral, non-oxidizing ligand having a dative bond to M (i equals 0, 1, 2 or 3); and, D and E are independently mono-anionic labile ligands, each having a sigma-bond to M, optionally bridged to each other or to $L^A$, $L^B$ or $L^C$.

As used herein, the term "monocyclic arenyl ligand" is used herein to mean a substituted or unsubstituted monoanionic $C_5$ to $C_{100}$ hydrocarbyl ligand that contains an aromatic five-membered single hydrocarbyl ring structure (also referred to as a cyclopentadienyl ring).

As used herein, the term "polycyclic arenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl or heteroatom substituted hydrocarbyl ring structures which may be fused to additional saturated, partially unsaturated, or aromatic hydrocarbyl or heteroatom substituted hydrocarbyl rings.

Cyclopentadienyl ligands, indenyl ligands fluorenyl ligands, tetrahydroindenyl ligands, cyclopenta[b]thienyl ligands, and cyclopenta[b]pyridyl ligands are all examples of arenyl ligands.

Non-limiting examples of $L^A$ include substituted or unsubstituted cyclopentadienyl ligands, indenyl ligands, fluorenyl ligands, dibenzo[b,h]fluorenyl ligands, benzo[b] fluorenyl ligands, azulenyl ligands, pentalenyl ligands, cyclopenta[b]naphthyl ligands, cyclopenta[a]naphthyl ligands, cyclopenta[b]thienyl ligands, cyclopenta[c]thienyl ligands, cyclopenta[b]pyrrolyl ligands, cyclopenta[c]pyrrolyl ligands, cyclopenta[b]furyl ligands, cyclopenta[c]furyl ligands, cyclopenta[b]phospholyl ligands, cyclopenta[c] phospholyl ligands, cyclopenta[b]pyridyl ligands, cyclopenta[c]pyridyl ligands, cyclopenta[c]phosphinyl ligands, cyclopenta[b]phosphinyl ligands, cyclopenta[g]quinolyl, cyclopenta[g]isoquinolyl, indeno[1,2-c]pyridyl, and the like, including hydrogenated versions thereof, for example tetrahydroindenyl ligands.

Non-limiting examples of $L^B$ include those listed for $L^A$ above. Additionally $L^B$ is defined as J, wherein J is represented by the formula J'-R''$_{k-1-j}$ and J' is bonded to M. J' is a heteroatom with a coordination number of three from group 15 or with a coordination number of two from group 16 of the Periodic Table of Elements, and is preferably nitrogen; R'' is selected from $C_1$-$C_{100}$ substituted or unsubstituted hydrocarbyl radical; k is the coordination number of the heteroatom J' where "k–1–j" indicates the number of R'' substituents bonded to J'. Non-limiting examples of J include all isomers (including cyclics) of propylamido, butylamido, pentylamido, hexylamido, heptylamido, octylamido, nonylamido, decylamido, undecylamido, docecylamido, phenylamido, tolylamido, xylylamido, benzylamido, biphenylamido, oxo, sulfandiyl, hexylphosphido and the like.

When present, T is a bridging group containing boron or a group 14, 15 or 16 element. Examples of suitable bridging groups include R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'$_2$CSiR'$_2$, R'$_2$SiSiR'$_2$, R'$_2$CSiR'$_2$CR'$_2$, R'$_2$SiCR$_2$SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'B, R'$_2$C—BR', R'$_2$C—BR'—CR'$_2$, R'$_2$C—O—CR'$_2$, R'$_2$C—S—CR'$_2$, R'$_2$C—Se—CR'$_2$, R'$_2$C—NR'—CR'$_2$, and R'$_2$C—PR'—CR'$_2$ where R' is hydrogen or a $C_1$-$C_{20}$ containing hydrocarbyl or substituted hydrocarbyl and optionally two or more adjacent R' may join to form a substituted or unsubstituted, saturated, partially unsaturated or aromatic, cyclic or polycyclic substituent.

Non-limiting examples of the bridging group T include $CH_2$, $CH_2CH_2$, $CMe_2$, $SiMe_2$, $SiEt_2$, $SiPh_2$, $SiMePh$, $Si(CH_2)_3$, $Si(CH_2)_4$, $Si(CH_2)_5$, $Si(Ph-p-SiEt_3)_2$, and the like.

Non-limiting examples of D and E are independently, fluoro, chloro, bromo, iodo, methyl, ethyl, benzyl, dimethylamido, methoxy, and the like.

More preferred are metallocenes which are bis-cyclopentadienyl derivatives of a group 4 transition metal, preferably zirconium or hafnium. See WO 99/41294. These may advantageously be derivatives containing a fluorenyl ligand and a cyclopentadienyl ligand connected by a single carbon and silicon atom. See WO 99/45040 and WO 99/45041. Most preferably, the Cp ring is unsubstituted and/or the bridge contains alkyl substituents, suitably alkylsilyl substituents to assist in the alkane solubility of the metallocene. See WO 00/24792 and WO 00/24793. Other possible metallocenes include those in WO 01/58912. Other suitable metallocenes may be bis-fluorenyl derivatives or unbridged indenyl derivatives which may be substituted at one or more positions on the fused ruing with moieties which have the effect of increasing the molecular weight and so indirectly permit polymerization at higher temperatures, such as described in EP 6 93 506 and EP 7 80 395.

Catalyst compounds that are particularly useful in this invention include one or more of the metallocene compounds listed and described in Paragraphs [0089]-[0162] of US 2015-0025209 A1, which was previously incorporated by reference herein. For instance, useful catalyst compounds may include any one or more of:
cyclotetramethylenesilylene-bis(2,4,7-trimethylinden-1-yl) hafnium dimethyl,
cyclopentamethylenesilylene-bis(2,4,7-trimethylinden-1-yl) hafnium dimethyl, cyclotrimethylenesilylene-bis(2,4,7-trimethylinden-1-yl) hafnium dimethyl,
cyclotetramethylenesilylene-bis(2,4-dimethylinden-1-yl) hafnium dimethyl,
cyclopentamethylenesilylene-bis(2,4-dimethylinden-1-yl) hafnium dimethyl,
cyclotrimethylenesilylene-bis(2,4-dimethylinden-1-yl)hafnium dimethyl,
cyclotetramethylenesilylene-bis(4,7-dimethylinden-1-yl) hafnium dimethyl,
cyclopentamethylenesilylene-bis(4,7-dimethylinden-1-yl) hafnium dimethyl,
cyclotrimethylenesilylene-bis(4,7-dimethylinden-1-yl)hafnium dimethyl,
cyclotetramethylenesilylene-bis(2-methyl-4-cyclopropylinden-1-yl)hafnium dimethyl,
cyclopentamethylenesilylene-bis(2-methyl-4-cyclopropylinden-1-yl)hafnium dimethyl,
cyclotrimethylenesilylene-bis(2-methyl-4-cyclopropylinden-1-yl)hafnium dimethyl,
cyclotetramethylenesilylene-bis (2-ethyl-4-cyclopropylinden-1-yl)hafnium dimethyl,
cyclopentamethylenesilylene-bis(2-ethyl-4-cyclopropylinden-1-yl)hafnium dimethyl,
cyclotrimethylenesilylene-bis(2-ethyl-4-cyclopropylinden-1-yl)hafnium dimethyl,
cyclotetramethylenesilylene-bis(2-methyl-4-t-butylinden-1-yl)hafnium dimethyl,
cyclopentamethylenesilylene-bis(2-methyl-4-t-butylinden-1-yl)hafnium dimethyl,
cyclotrimethylenesilylene-bis(2-methyl-4-t-butylinden-1-yl)hafnium dimethyl,
cyclotetramethylenesilylene-bis(4,7-diethylinden-1-yl)hafnium dimethyl,
cyclopentamethylenesilylene-bis(4,7-diethylinden-1-yl)hafnium dimethyl,
cyclotrimethylenesilylene-bis(4,7-diethylinden-1-yl)hafnium dimethyl,
cyclotetramethylenesilylene-bis(2,4-diethylinden-1-yl)hafnium dimethyl,
cyclopentamethylenesilylene-bis(2,4-diethylinden-1-yl)hafnium dimethyl,
cyclotrimethylenesilylene-bis(2,4-diethylinden-1-yl)hafnium dimethyl,
cyclotetramethylenesilylene-bis(2-methyl-4,7-diethylinden-1-yl)hafnium dimethyl,
cyclopentamethylenesilylene-bis(2-methyl-4,7-diethylinden-1-yl)hafnium dimethyl,
cyclotrimethylenesilylene-bis(2-methyl-4,7-diethylinden-1-yl)hafnium dimethyl,
cyclotetramethylenesilylene-bis(2-ethyl-4-methylinden-1-yl)hafnium dimethyl,
cyclopentamethylenesilylene-bis(2-ethyl-4-methylinden-1-yl)hafnium dimethyl,
cyclotrimethylenesilylene-bis(2-ethyl-4-methylinden-1-yl) hafnium dimethyl,
cyclotetramethylenesilylene-bis(2-methyl-4-isopropylinden-1-yl)hafnium dimethyl,
cyclopentamethylenesilylene-bis(2-methyl-4-isopropylinden-1-yl)hafnium dimethyl,
cyclotrimethylenesilylene-bis(2-methyl-4-isopropylinden-1-yl)hafnium dimethyl.

Likewise, the catalyst compounds described herein may be synthesized in any suitable manner, including in accordance with procedures described in Paragraphs [0096] and [00247]-[00298] of U.S. Ser. No. 14/325,449, filed Jul. 8, 2014 and published as US 2015/0025209 A1.

Additional useful catalyst compounds may include any one or more of:
rac-dimethylsilylbis[(2-methyl-4-phenyl)indenyl] zirconiumdimethyl,
rac-dimethylsilylbis[(2-methyl)indenyl] zirconiumdimethyl,
rac-dimethylsilyl-bis(indenyl)hafniumdimethyl,
rac-dimethylsilyl-bis(indenyl)hafniumdichloride,
rac-dimethylsilyl-bis(indenyl)zirconiumdimethyl,
rac-dimethylsilyl-bis(indenyl)zirconiumdichloride,
rac-dimethylsilyl-bis(2-methyl-4-phenyl-indenyl)hafniumdimethyl,
rac-dimethylsilyl-bis(2-methyl-4-phenyl-indenyl) hafniumdichloride,
rac-dimethylsilyl-bis(2-methyl-4-phenyl-indenyl) zirconiumdimethyl,
rac-dimethylsilyl-bis(2-methyl-4-phenyl-indenyl) zirconiumdichloride,
rac-dimethylsilyl-bis(2-methyl-benzindenyl)hafniumdimethyl,
rac-dimethylsilyl-bis(2-methyl-benzindenyl) hafniumdichloride,
rac-dimethylsilyl-bis(2-methyl-benzindenyl) zirconiumdimethyl,
rac-dimethylsilyl-bis(2-methyl-benzindenyl) zirconiumdichloride,
bis(1-methyl,4-butylcyclopentadienyl)zirconiumdichloride,
bis(1-methyl,4-butylcyclopentadienyl)zirconiumdimethyl,
bis(1-methyl,4-butylcyclopentadienyl)zirconiumdimethoxide,
bis(1-methyl,4-butylcyclopentadienyl)zirconiumdibenzyl,
bis(1-methyl,4-butylcyclopentadienyl)zirconiumdifluoride,
bis(1-methyl,4-butylcyclopentadienyl)zirconiumdiamide,
bis(1-methyl,4-ethylcyclopentadienyl)zirconiumdichloride,
bis(1-methyl,4-ethylcyclopentadienyl)zirconiumdimethyl,
bis(1-methyl,4-benzylcyclopentadienyl)zirconiumdichloride,
bis(1-methyl,4-benzylcyclopentadienyl)zirconiumdimethyl,
bis(1-methyl,3-butylcyclopentadienyl)zirconiumdichloride,
bis(1-methyl,3-butylcyclopentadienyl)zirconiumdimethyl,
bis(1-methyl,3-n-propylcyclopentadienyl)zirconiumdichloride, and/or
bis(1-methyl,3-n-propylcyclopentadienyl)zirconiumdimethyl.

Suitable mono-Cp amido group 4 complexes useful herein include:
dimethylsilylene(tetramethylcyclopentadienyl)(cyclododecylamido)titanium dimethyl;
dimethylsilylene(tetramethylcyclopentadienyl)(tert-butylamido)titanium dimethyl;
dimethylsilylene(tetramethylcyclopentadienyl)(adamantylamido)titanium dimethyl;
dimethylsilylene(tetramethylcyclopentadienyl)(cyclooctylamido)titanium dimethyl;
dimethylsilylene(tetramethylcyclopentadienyl)(cyclohexylamido)titanium dimethyl;
dimethylsilylene(tetramethylcyclopentadienyl)(norbornylamido)titanium dimethyl
dimethylsilylene(trimethylcyclopentadienyl)(cyclododecylamido)titanium dimethyl;
dimethylsilylene(trimethylcyclopentadienyl)(adamantylamido)titanium dimethyl;
dimethylsilylene(trimethylcyclopentadienyl)(tert-butylamido)titanium dimethyl;
dimethylsilylene(6-methyl-1,2,3,5-tetrahydro-s-indacen-5-yl)(tert-butylamido)titanium dimethyl; dimethylsilylene(6-methyl-1,2,3,5-tetrahydro-s-indacen-5-yl)(adamantylamido)titanium dimethyl; dimethylsilylene(6-methyl-1, 2,3,5-tetrahydro-s-indacen-5-yl)(cyclooctylamido) titanium dimethyl; dimethylsilylene(6-methyl-1,2,3,5-tetrahydro-s-indacen-5-yl)(cyclohexylamido)titanium dimethyl; dimethylsilylene(6-methyl-1,2,3,5-tetrahydro-s-indacen-5-yl)(cyclododecylamido)titanium dimethyl;
dimethylsilylene(2,2,6-trimethyl-1,2,3,5-tetrahydro-s-indacen-5-yl)(adamantylamido)titanium dimethyl; dimethylsilylene(2,2,6-trimethyl-1,2,3,5-tetrahydro-s-indacen-5-yl)(cyclohexylamido)titanium dimethyl; dimethylsilylene(2,2,6-trimethyl-1,2,3,5-tetrahydro-s-indacen-5-yl)(cyclododecylamido)titanium dimethyl; dimethylsilylene(2,2,6-trimethyl-1,2,3,5-tetrahydro-s-indacen-5-yl)(tert-butylamido)titanium dimethyl and any combination thereof.

Particularly useful fluorenyl-cyclopentadienyl group 4 complexes include:
1,1'-bis(4-triethylsilylphenyl)methylene-(cyclopentadienyl)(2,7-di-tert-butyl-fluoren-9-yl)hafnium dimethyl;
dimethylsilylene(cyclopentadienyl)(2,7-di-tert-butyl-fluoren-9-yl)hafnium dimethyl;
dimethylsilylene(cyclopentadienyl)(3,6-di-tert-butyl-fluoren-9-yl)hafnium dimethyl;
diphenylmethylene(cyclopentadienyl)(2,7-di-tert-butyl-fluoren-9-yl)hafnium dimethyl;
diphenylmethylene(cyclopentadienyl)(3,6-di-tert-butyl-fluoren-9-yl)hafnium dimethyl;
isopropylidene(cyclopentadienyl)(2,7-di-tert-butyl-fluoren-9-yl)hafnium dimethyl;
isopropylidene(cyclopentadienyl)(3,6-di-tert-butyl-fluoren-9-yl)hafnium dimethyl;
dimethylsilylene(cyclopentadienyl)(2,7-dimethylfluoren-9-yl)hafnium dimethyl;
dimethylsilylene(cyclopentadienyl)(3,6-dimethylfluoren-9-yl)hafnium dimethyl;
diphenylmethylene(cyclopentadienyl)(2,7-dimethylfluoren-9-yl)hafnium dimethyl;
diphenylmethylene(cyclopentadienyl)(3,6-dimethylfluoren-9-yl)hafnium dimethyl;
dimethylsilylene(cyclopentadienyl)(fluoren-9-yl)hafnium dimethyl;
isopropylidene(cyclopentadienyl)(fluoren-9-yl)hafnium dimethyl;
diphenylmethylene(cyclopentadienyl)(fluoren-9-yl)hafnium dimethyl, and 1,1'-bis(4-triethylsilylphenyl)methylene(cyclopentadienyl)(2,7-di-tert-butyl-fluoren-9-yl)hafnium dimethyl.

Particularly useful complexes include:
dimethylsilylene(cyclopentadienyl)(2,7-di-tert-butyl-fluoren-9-yl)hafnium dimethyl;
dimethylsilylene(cyclopentadienyl)(3,6-di-tert-butyl-fluoren-9-yl)hafnium dimethyl;
diphenylmethylene(cyclopentadienyl)(2,7-di-tert-butyl-fluoren-9-yl)hafnium dimethyl;
diphenylmethylene(cyclopentadienyl)(3,6-di-tert-butyl-fluoren-9-yl)hafnium dimethyl;
isopropylidene(cyclopentadienyl)(2,7-di-tert-butyl-fluoren-9-yl)hafnium dimethyl;
isopropylidene(cyclopentadienyl)(3,6-di-tert-butyl-fluoren-9-yl)hafnium dimethyl;
dimethylsilylene(cyclopentadienyl)(2,7-dimethylfluoren-9-yl)hafnium dimethyl;
dimethylsilylene(cyclopentadienyl)(3,6-dimethylfluoren-9-yl)hafnium dimethyl;
diphenylmethylene(cyclopentadienyl)(2,7-dimethylfluoren-9-yl)hafnium dimethyl;
diphenylmethylene(cyclopentadienyl)(3,6-dimethylfluoren-9-yl)hafnium dimethyl;
dimethylsilylene(cyclopentadienyl)(fluoren-9-yl)hafnium dimethyl;
isopropylidene(cyclopentadienyl)(fluoren-9-yl)hafnium dimethyl;
diphenylmethylene(cyclopentadienyl)(fluoren-9-yl)hafnium dimethyl; and
1,1'-bis(4-triethylsilylphenyl)methylene(cyclopentadienyl)(2,7-di-tert-butyl-fluoren-9-yl)hafnium dimethyl.

In yet further embodiments, suitable catalyst compounds may be characterized as chelated transition metal complexes (type 1), such as those having the following structural formula (4):

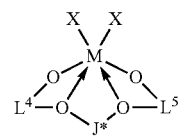

where: (1) J* is a divalent bridging group comprising C, Si, or both; (2) M is a group 4 metal, preferably hafnium and zirconium; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) $L^4$ and $L^5$ are independently, a substituted monocyclic or polycyclic aromatic groups.

In some embodiments, J* is a divalent substituted or unsubstituted $C_{3-6}$ aliphatic or cycloaliphatic group.

In some embodiments, $L^4$ and $L^5$ are independently a monocyclic or polycyclic aromatic group substituted with any combination alkyl, aryl, alkoxy, or amino substituents which may optionally be substituted with halogens.

In yet further embodiments, suitable catalyst compounds that are chelated transition metal complexes (type 1), may be characterized as biphenyl phenol transition metal complexes, such as those having the following structural formula (4a):

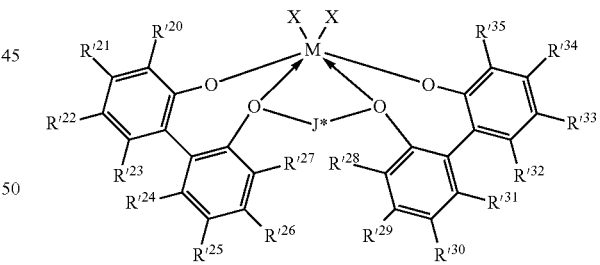

where: (1) J* is a divalent bridging group comprising C, Si, or both; (2) M is a group 4 metal, preferably hafnium and zirconium; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) each $R'^{20}$, $R'^{21}$, $R'^{22}$, $R'^{23}$, $R'^{24}$, $R'^{25}$, $R'^{26}$, $R'^{27}$, $R'^{28}$, $R'^{29}$, $R'^{30}$, $R'^{31}$, $R'^{32}$, $R'^{33}$, $R'^{34}$, $R'^{35}$ is independently hydrogen, halo, $C_1$-$C_{50}$ hydrocarbyl, substituted hydrocarbyl, halocarbyl or substituted halocarbyl.

In particular embodiments, each $R'^{20}$ and $R'^{35}$ may be or may comprise a bulky substituent, such as substituted or unsubstituted aryl, carbazolyl, fluorenyl and/or anthracenyl.

In other particular embodiments, each $R'^{20}$ and $R'^{35}$ independently may be 3,5-di(isopropyl)phenyl, 3,5-di(isobutyl)phenyl, 3,5-di(tert-butyl)phenyl, carbazol-9-yl, 3,6-di-tert-butylcarbazol-9-yl, 2,3,4,5,6,7,8,9-octahydrocarbazol-1-yl, anthracen-9-yl, 1,2,3,4,5,6,7,8-octahydroanthracen-9-yl, naphthyl, fluoren-9-yl, 9-methylfluoren-9-yl, 1,2,3,4,5,6,7,8-octahydrofluoren-9-yl, or 9-methyl-1,2,3,4,5,6,7,8-octahydrofluoren-9-yl.

In other particular embodiments, $R'^{22}$ and $R'^{33}$ are independently $C_1$-$C_{10}$ hydrocarbyl, alternatively $C_1$-$C_{10}$ alkyls such as methyl, ethyl and all isomers of propyl, butyl, pentyl, hexyl, heptyl, octyl, nonyl and decyl.

In other particular embodiments, $R'^{25}$ and $R'^{30}$ are independently $C_1$-$C_{10}$ substituted or unsubstituted hydrocarbyl, halo, $C_1$-$C_{10}$ alkoxy, and $C_2$-$C_{20}$ dialkylamino. Alternatively $R'^{25}$ and $R'^{30}$ are independently $C_1$-$C_{10}$ alkyls such as methyl, ethyl and all isomers of propyl, butyl, pentyl, hexyl, heptyl, octyl, nonyl and decyl (including cyclic and linear or branched cyclic combinations); halogens such as fluoro, chloro, bromo; $C_1$-$C_{10}$ alkoxy such as methoxy, ethoxy, and all isomers of propoxy, butoxy, pentoxy, hexoxy, heptoxy, octoxy, nonoxy, and decoxy (including cyclic and linear or branched cyclic combinations); $C_2$-$C_{20}$ dialkylamino such as dimethyl amino, diethyl amino, and all isomers of dipropylamino, dibutylamino, dipentylamino, dihexylamino, diheptylamino, dioctylamino, dinonylamino, didecylamino (including cyclic and linear or branched cyclic combinations) and mixed alkyls such as methylethylamino, methylbutyl amino and the like.

In other particular embodiments, J* may be propan-1,3-diyl, butan-1,4-diyl, cyclohexanediyl, cyclohexen-4,5-diyl, or bis(methylene)cyclohexan-1,2-diyl.

Non-limiting examples of particularly useful biphenyl phenol transition metal complexes are illustrated below, wherein M is hafnium or zirconium and X is methyl, benzyl, or chloro:

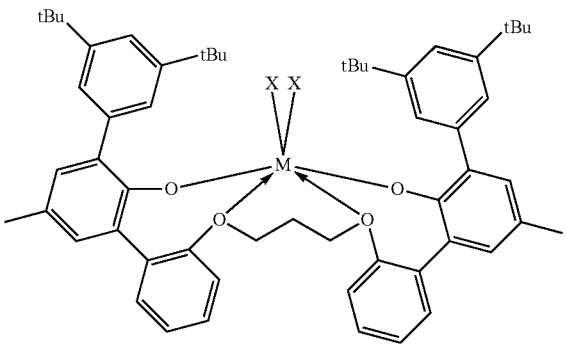

-continued

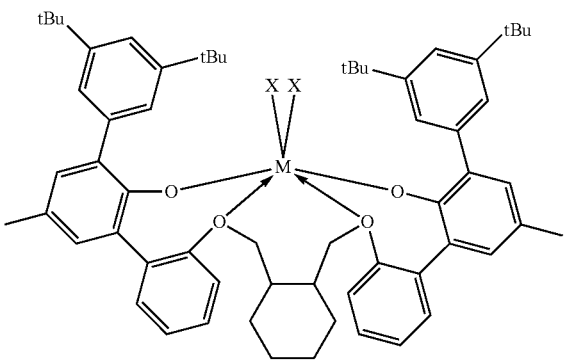

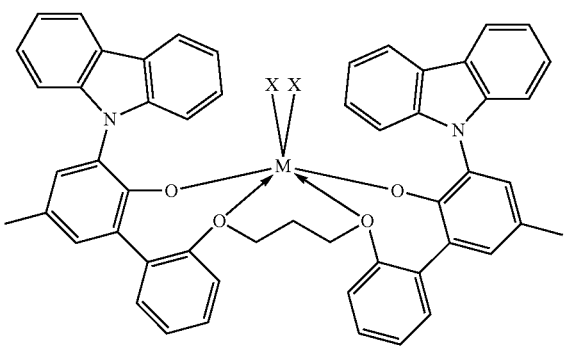

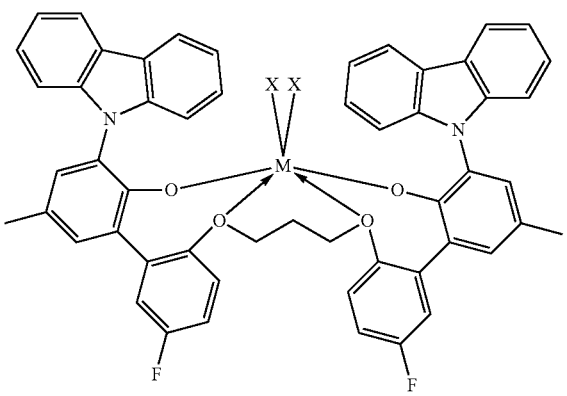

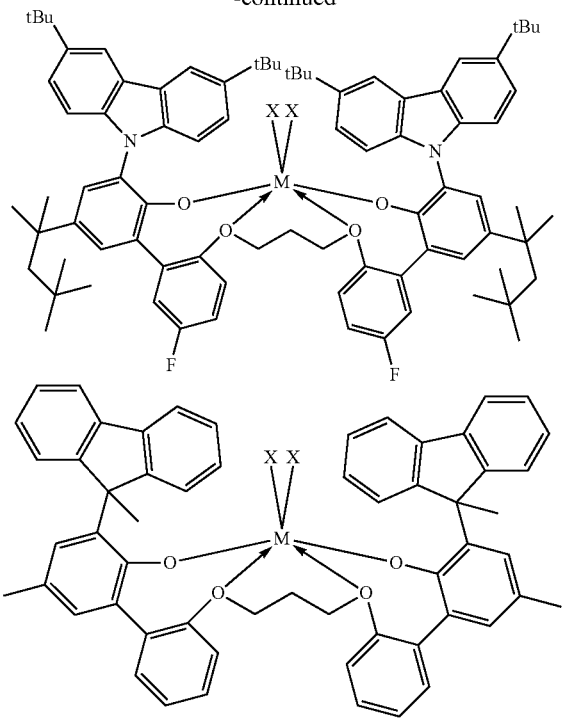

Additional particularly useful biphenyl phenol transition metal complexes are described in WO 2003/091262; WO 2005/108406; US 2006/0025548; US 2006/0052554; WO 2007/136494; WO 2007/136496; WO 2007/136495; WO 2009/064482; and WO2013/096573, and are incorporated by reference.

In yet further embodiments, suitable catalyst compounds may be characterized as chelated transition metal complexes (type 2), such as those having the following structural formula (5):

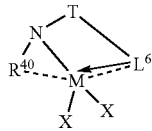

wherein (1) M is a group 4 metal, preferably hafnium; (2) $L^6$ is a $C_5$-$C_{20}$ heteroaryl group containing a Lewis base functionality, especially pyridine-2-yl or substituted pyridine-2-yl group or a divalent derivative thereof; (3) $R^{40}$ is selected from a $C_1$-$C_{30}$ alkyl, cycloalkyl, heteroalkyl, cycloheteroalkyl, aryl and substituted derivatives thereof or a divalent derivative thereof; (4) T is a divalent bridging group comprising carbon and or silicon, preferably a $C_1$-$C_{20}$ hydrocarbyl substituted methylene or silane group; (5) each X is independently a univalent anionic ligand, or two Xs are joined and bound to the metal atom to form a metallocycle ring, or two Xs are joined to form a chelating ligand, a diene ligand, or an alkylidene ligand; (6) N is nitrogen; and (7) bonds, optional bonds and dative bonds are represented by lines, dotted lines and arrows, respectively.

In yet further embodiments, suitable catalyst compounds that are chelated transition metal complexes (type 2), may be characterized as pyridyl amide metal complexes, such as those having the following structural formula (5a):

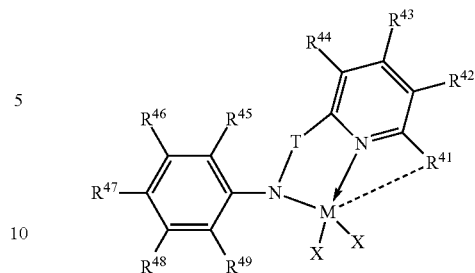

wherein M, T, N and X are as previously defined as in formula (5); each $R^{41}$, $R^{42}$, $R^{43}$, and $R^{44}$ are independently hydrogen, halo, or an alkyl, cycloalkyl, heteroalkyl, heterocycloalkyl, aryl or silyl group, or one or more adjacent $R^{41}$-$R^{44}$ may be joined together to form a fused ring derivative; $R^{45}$-$R^{49}$ are independently hydrogen, or $C_1$-$C_{10}$ alkyl, most preferably $R^{45}$ and $R^{49}$ are alkyl such as isopropyl or tert-butyl; T is preferably $CR'^{50}R'^{51}$ where $R'^{50}$ and $R'^{51}$ are independently hydrogen, halogen, a $C_1$-$C_{20}$ hydrocarbyl, most preferably, one of $R'^{50}$ and $R'^{51}$ is hydrogen and the other is a $C_6$-$C_{20}$ aryl group, especially 2-isopropyl, phenyl or a fused polycyclic aryl group, most preferably anthracenyl; and bonds, optional bonds and dative bonds are represented by lines, dotted lines and arrows, respectively.

Non-limiting examples of pyridyl amide catalysts that are chelated transition metal complexes (type 2) are illustrated below, wherein X is preferably methyl, benzyl or chloro:

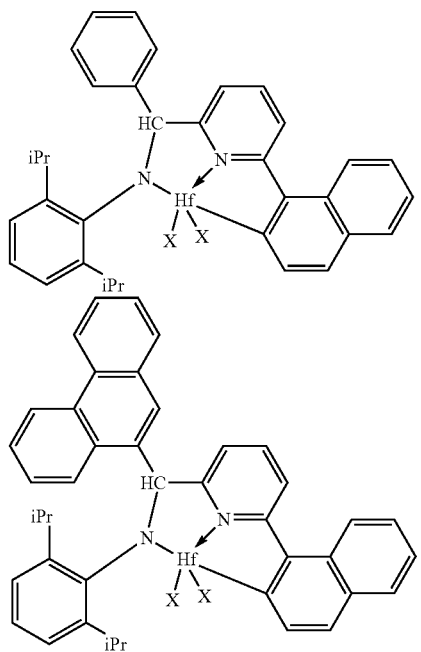

Additional particularly useful chelated transition metal complexes (type 2) including pyridyl amide transition metal complexes are described in WO 2010/0227990; US 2004/0220050; WO 2004/026925; WO 2004/024740; WO 2004/024739; WO 2003/040201; WO 2002/046249; and WO2002/038628, and are incorporated by reference.

In yet further embodiments, suitable catalyst compounds may be characterized as chelated transition metal complexes (type 3), such as those having the following structural formula (6):

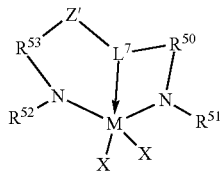

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl or substituted pyridinyl group; (4) Z' is a divalent linker group, $(R^{56})_pC$—$C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7 or 8 ring carbon atoms and where the substituents on the ring can join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X is independently a univalent anionic ligand, or two Xs are joined and bound to the metal atom to form a metallocycle ring, or two Xs are joined to form a chelating ligand, a diene ligand, or an alkylidene ligand.

In yet further embodiments, suitable catalyst compounds that are chelated transition metal complexes (type 3), may be characterized as pyridyl diamide metal complexes, such as those having the following structural formula (6a):

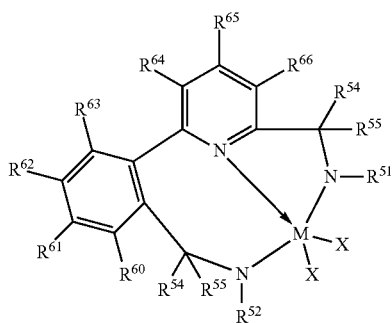

wherein M, X, N, $R^{51}$, $R^{52}$, $R^{54}$, and $R^{55}$ are as previously defined as in formula (6); $R^{60}$, $R^{61}$, $R^{62}$, $R^{63}$, $R^{64}$, $R^{65}$, $R^{66}$ are independently selected from the group consisting of hydrogen, hydrocarbyls, substituted hydrocarbyls, alkoxy, aryloxy, halogen, amino, and silyl, and wherein any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings.

In an embodiment of the invention, $R^{60}$ to $R^{66}$ are hydrogen.

In an embodiment of the invention, $R^{62}$ is joined with $R^{63}$ to form a phenyl ring fused to the existing phenyl ring (e.g., a naphthyl group), and $R^{60}$, $R^{61}$, $R^{64}$, $R^{65}$, and $R^{66}$ are independently hydrogen or an alkyl group, preferably hydrogen.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups for $R^{54}$ or $R^{55}$ include phenyl, 2-methylphenyl, 2-ethylphenyl, 2-isopropylphenyl, and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In yet further embodiments, suitable catalyst compounds that are chelated transition metal complexes (type 3), may be characterized as pyridyl diamide metal complexes, such as those having the following structural formula (6b):

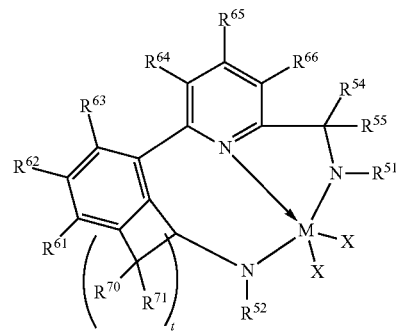

wherein M, X, N, $R^{51}$, $R^{52}$, $R^{54}$, $R^{55}$, $R^{61}$-$R^{66}$ are as previously defined as in formulae (6) and (6a); each $R^{70}$-$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$-$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

In an embodiment of the invention, $R^{61}$-$R^{66}$ are hydrogen.

In an embodiment of the invention, each $R^{70}$ and $R^{71}$ are independently hydrogen, and t is 2 or 3, preferably 2.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups include phenyl and 2-methylphenyl, 2-ethylphenyl, 2-isopropylphenyl and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In an embodiment of the invention, $R^{54}$, $R^{55}$, $R^{61}$-$R^{66}$, each $R^{70}$-$R^{71}$ are hydrogen, $R^{52}$ is phenyl, $R^{51}$ is 2,6-diisopropylphenyl and t is 2.

Non-limiting examples of pyridyl diamide catalysts that are chelated transition metal complexes (type 3) are illustrated below, wherein X is methyl, benzyl, or chloro:

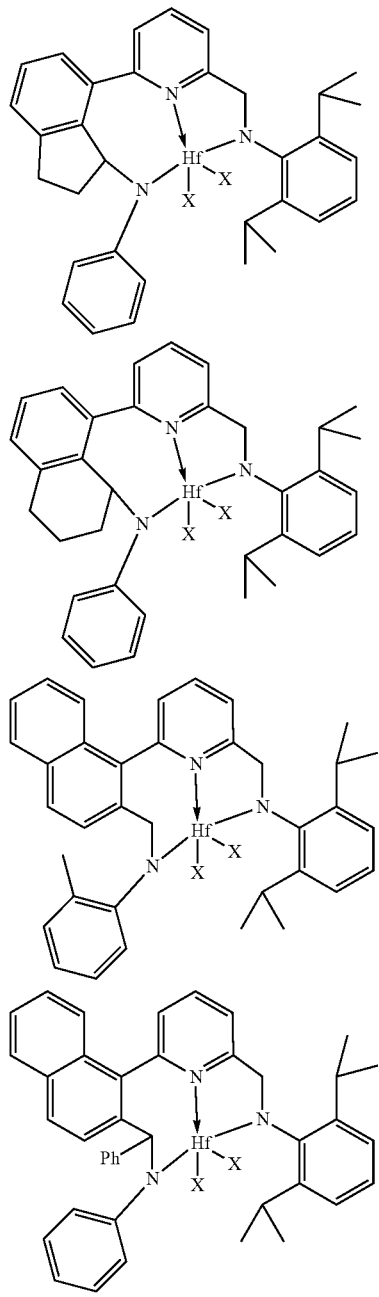

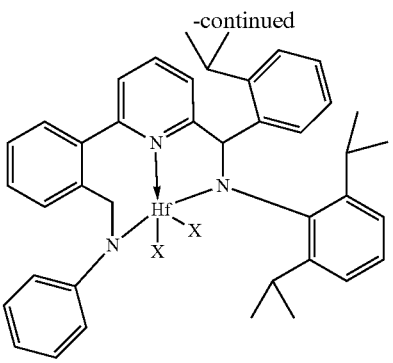

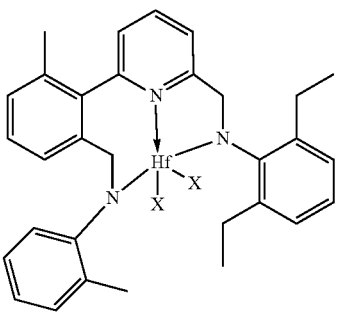

Additional particularly useful chelated transition metal complexes (type 3) including pyridyl diamide transition metal complexes are described in US 2014/0316089; WO 2012/134614; WO 2012/134615; WO 2012/134613; US 2012/0071616; US 2011/0301310; and US 2010/0022726 and are incorporated by reference.

U.S. Pat. Nos. 6,180,736; 7,179,876; 8,957,171; and 9,045,568; also provide suitable unbridged metallocenes that are useful herein.

Specific examples of useful metallocenes include, but are not limited to, (1,3-MeBuCp)$_2$ZrMe$_2$,
rac-dimethylsilylbis[(2-methyl-4-phenyl)indenyl] zirconiumdimethyl,
rac-dimethylsilylbis[(2-methyl)indenyl] zirconiumdimethyl,
rac-dimethylsilyl-bis(indenyl)hafniumdimethyl,
rac-dimethylsilyl-bis(indenyl)hafniumdichloride,
rac-dimethylsilyl-bis(indenyl)zirconiumdimethyl,
rac-dimethylsilyl-bis(indenyl)zirconiumdichloride,
rac-dimethylsilyl-bis(2-methyl-4-phenyl-indenyl)hafniumdimethyl,
rac-dimethylsilyl-bis(2-methyl-4-phenyl-indenyl) hafniumdichloride,
rac-dimethylsilyl-bis(2-methyl-4-phenyl-indenyl) zirconiumdimethyl,
rac-dimethylsilyl-bis(2-methyl-4-phenyl-indenyl) zirconiumdichloride,
rac-dimethylsilyl-bis(2-methyl-benzindenyl)hafniumdimethyl,
rac-dimethylsilyl-bis(2-methyl-benzindenyl) hafniumdichloride,
rac-dimethylsilyl-bis(2-methyl-benzindenyl) zirconiumdimethyl,
rac-dimethylsilyl-bis(2-methyl-benzindenyl) zirconiumdichloride,
rac-dimethylsilyl-bis-(2-methyl-indenyl) zirconiumdimethyl,
rac-dimethylsilyl-bis-(2-methyl-indenyl) hafniumdimethyl,
rac-dimethylsilyl-bis-(2-methyl-indenyl) hafniumdichloride, rac-dimethylsilyl-bis-(2-methyl-indenyl) zirconiumdichloride,
rac-dimethylsilyl-bis(2-methyl-4-naphthyl-indenyl)hafniumdimethyl,
rac-dimethylsilyl-bis(2-methyl-4-naphthyl-indenyl) zirconiumdichloride,
rac-dimethylsilyl-bis(2-methyl-4-naphthyl-indenyl) hafniumdichloride,
rac-dimethylsilyl-bis(2-methyl-4-naphthyl-indenyl) zirconiumdimethyl,
rac-ethylene-bis(indenyl)hafniumdimethyl,
rac-ethylene-bis(indenyl)hafniumdichloride,
rac-ethylene-bis(indenyl)zirconiumdimethyl,
rac-ethylene-bis(indenyl)zirconiumdichloride,
rac-dimethylsilyl-bis(2-methyl-4-(2'-methyl-phenyl)-indenyl)hafniumdimethyl,
rac-dimethylsilyl-bis(2-methyl-4-(2'-methyl-phenyl)-indenyl)hafniumdichloride,
rac-dimethylsilyl-bis(2-methyl-4-(2'-methyl-phenyl)-indenyl)zirconiumdimethyl,
rac-dimethylsilyl-bis(2-methyl-4-(2'-methyl-phenyl)-indenyl) zirconiumdichloride,
rac-dimethylsilyl-bis(2-methyl-4-(4'-methyl-phenyl)-indenyl)hafniumdimethyl,
rac-dimethylsilyl-bis(2-methyl-4-(4'-methyl-phenyl)-indenyl)hafniumdichloride,
rac-dimethylsilyl-bis(2-methyl-4-(4'-methyl-phenyl)-indenyl)zirconiumdimethyl,
rac-dimethylsilyl-bis(2-methyl-4-(4'-methyl-phenyl)-indenyl) zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl-phenyl)-indenyl)hafniumdichloride,
rac-dimethylsilyl-bis(2-methyl-4-(4'-tert-butyl-phenyl)-indenyl)zirconiumdimethyl,
rac-dimethylsilyl-bis(2-methyl-4-(4'-tert-butyl-phenyl)-indenyl) zirconiumdichloride,
rac-dimethylsilyl-bis(2-methyl-4-(4'-tert-butyl-phenyl)-indenyl)hafniumdimethyl,
rac-dimethylsilyl-bis(2-methyl-4-(4'-tert-butyl-phenyl)-indenyl)hafniumdichloride,
rac-dimethylsilyl-bis(2-methyl-4-(4'-tert-butyl-phenyl)-indenyl)zirconiumdimethyl,
rac-dimethylsilyl-bis(2-methyl-4-(4'-tert-butyl-phenyl)-indenyl) zirconiumdichloride,
rac-dimethylsilyl-(2-methyl-4-(4'-tert-butyl-phenyl)-indenyl)(2-isoprpyl-4-(4'-tert-butyl-phenyl)-indenyl)hafniumdimethyl,
rac-dimethylsilyl-(2-methyl-4-(4'-tert-butyl-phenyl)-indenyl)(2-isoprpyl-4-(4'-tert-butyl-phenyl)-indenyl)hafniumdichloride,
rac-dimethylsilyl-(2-methyl-4-(4'-tert-butyl-phenyl)-indenyl)(2-isoprpyl-4-(4'-tert-butyl-phenyl)-indenyl)zirconiumdichloride,
rac-dimethylsilyl-(2-methyl-4-(4'-tert-butyl-phenyl)-indenyl)(2-isoprpyl-4-(4'-tert-butyl-phenyl)-indenyl)zirconiumdimethyl,
rac-dimethylsilyl-bis(2-methyl-4,6-diisopropyl-indenyl) hafniumdimethyl,
rac-dimethylsilyl-bis(2-methyl-4,6-diisopropyl-indenyl)zirconiumdimethyl,
rac-dimethylsilyl-bis(2-methyl-4,6-diisopropyl-indenyl)zirconiumdichloride,
rac-dimethylsilyl-bis(2-methyl-4,6-diisopropyl-indenyl) hafniumdichloride,
Bis(cyclopentadieneyl)zirconiumdichloride,
Bis(cyclopentadienyl)zirconiumdimethyl,
Bis(pentamethylcyclopentadieneyl)zirconiumdichloride,
Bis(pentamethylcyclopentadienyl)zirconiumdimethyl,
Bis(cyclopentadieneyl)(pentamethylcyclopentadienyl)zirconiumdichloride,
Bis(cyclopentadienyl)(pentamethylcyclopentadienyl)zirconiumdimethyl,
Bis(1-methyl,4-butylcyclopentadienyl)zirconiumdichloride,
Bis(1-methyl,4-butylcyclopentadienyl)zirconiumdimethyl,
Bis(1-methyl,4-butylcyclopentadienyl)zirconiumdimethoxide,
Bis(1-methyl,4-butylcyclopentadienyl)zirconiumdibenzyl,
Bis(1-methyl,4-butylcyclopentadienyl)zirconiumdifluoride,
Bis(1-methyl,4-butylcyclopentadienyl)zirconiumdiamide,
Bis(1-methyl,4-ethylcyclopentadienyl)zirconiumdichloride,
Bis(1-methyl,4-ethylcyclopentadienyl)zirconiumdimethyl,
Bis(1-methyl,4-benzylcyclopentadienyl)zirconiumdichloride,
Bis(1-methyl,4-benzylcyclopentadienyl)zirconiumdimethyl,
Bis(1-methyl,3-butylcyclopentadienyl)zirconiumdichloride,
Bis(1-methyl,3-butylcyclopentadienyl)zirconiumdimethyl,
Bis(1-methyl,3-n-propylcyclopentadienyl)zirconiumdichloride,
Bis(1-methyl,3-n-propylcyclopentadienyl)zirconiumdimethyl,
Bis(1-methyl,3-iso-propylcyclopentadienyl)zirconiumdichloride,
Bis(1-methyl,3-iso-propylcyclopentadienyl)zirconiumdimethyl,
Bis(1,3-dimethylcyclopentadienyl)zirconiumdichloride,
Bis(1,3-dimethylcyclopentadienyl)zirconiumdimethyl,
Bis(n-propylcyclopentadienyl)zirconiumdichloride,
Bis(n-propylcyclopentadienyl)zirconiumdimethyl,
Bis(n-propylcyclopentadienyl)zirconiumdifluoride,
Bis(n-propylcyclopentadienyl)zirconiumdiamide,
Bis(n-propylcyclopentadienyl)zirconiumdibenzyl,
Bis(n-propylcyclopentadienyl)zirconiumdimethoxide,
Bis(n-propylcyclopentadienyl)hafniumdichloride,
Bis(n-propylcyclopentadienyl)hafniumdimethyl,
Bis(n-propylcyclopentadienyl)hafniumdifluoride,
Bis(n-propylcyclopentadienyl)hafniumdiamide,
Bis(n-propylcyclopentadienyl)hafniumdibenzyl,
Bis(n-propylcyclopentadienyl)hafniumdimethoxide,
Bis(n-butylcyclopentadienyl)zirconiumdichloride,
Bis(n-butylcyclopentadienyl)zirconiumdimethyl,
Bis(tert-butylcyclopentadienyl)zirconiumdichloride,
Bis(tert-butylcyclopentadienyl)zirconiumdimethyl,
Bis(benzylcyclopentadienyl)zirconiumdichloride,
Bis(benzylcyclopentadienyl)zirconiumdimethyl,
Bis(benzylcyclopentadienyl)(pentamethylcyclopentadienyl) zirconiumdimethyl,
Bis(benzylcyclopentadienyl)(pentamethylcyclopentadienyl) zirconiumdichloride,
Bis(propylcyclopentadienyl)(pentamethylcyclopentadienyl) zirconiumdimethyl,
Bis(propylcyclopentadienyl)(pentamethylcyclopentadienyl) zirconiumdichloride,
Bis(propylcyclopentadienyl)(tetramethylcyclopentadienyl) zirconiumdimethyl,
Bis(propylcyclopentadienyl)(tetramethylcyclopentadienyl) zirconiumdichloride,
Bis(tetramethyl,propylcyclopentadienyl)(pentamethylcyclopentadienyl)zirconiumdimethyl,
Bis(tetramethyl,propylcyclopentadienyl)(pentamethylcyclopentadienyl)zirconiumdichloride, Bis(tetramethyl,propylcyclopentadienyl)(cyclopentadienyl)zirconiumdimethyl,
Bis(tetramethyl,propylcyclopentadienyl)(cyclopentadienyl)zirconiumdichloride,
Dimethylsilylbis(cyclopentadienyl)zirconiumdichloride,
Dimethylsilylbis(cyclopentadienyl)zirconiumdimethyl,
Dimethylsilylbis(cyclopentadienyl)zirconiumdimethoxide,
Dimethylsilylbis(cyclopentadienyl)zirconiumdiamide,
Dimethylsilylbis(cyclopentadienyl)zirconiumdifluoride,
Dimethylsilylbis(cyclopentadienyl)zirconiumdiiodide,
Dimethylsilylbis(cyclopentadienyl)zirconiumdibromide,
Dimethylsilylbis(pentamethylcyclopentadienyl)zirconiumdichloride,
Dimethylsilylbis(pentamethylcyclopentadienyl)zirconiumdimethyl,
Dimethylsilylbis(pentamethylcyclopentadienyl)zirconiumdifluoride,
Dimethylsilylbis(pentamethylcyclopentadienyl)zirconiumdimethoxide,
Dimethylsilylbis(pentamethylcyclopentadienyl)zirconiumdiamide,
Dimethylsilylbis(pentamethylcyclopentadienyl)zirconiumdibromide,
Dimethylsilylbis(pentamethylcyclopentadienyl)zirconiumdibenzyl,
Dimethylsilylbis(cyclopentadienyl)(pentamethylcyclopentadienyl)zirconiumdichloride,
Dimethylsilylbis(cyclopentadienyl)(pentamethylcyclopentadienyl)zirconiumdimethyl,
Dimethylsilylbis(cyclopentadienyl)(pentamethylcyclopentadienyl)zirconiumdimethoxide,
Dimethylsilylbis(cyclopentadienyl)(pentamethylcyclopentadienyl)zirconiumdibromide,
Dimethylsilylbis(cyclopentadienyl)(pentamethylcyclopentadienyl)zirconiumdiamide,
Dimethylsilylbis(cyclopentadienyl)(pentamethylcyclopentadienyl)zirconiumdifluoride,
Dimethylsilylbis(cyclopentadienyl)(pentamethylcyclopentadienyl)zirconiumdibenzyl,
Dimethylsilylbis(1-methyl,4-butylcyclopentadienyl)zirconiumdichloride,
Dimethylsilylbis(1-methyl,4-butylcyclopentadienyl)zirconiumdimethyl,
Dimethylsilylbis(1-methyl,4-butylcyclopentadienyl)zirconiumdimethoxide,
Dimethylsilylbis(1-methyl,4-butylcyclopentadienyl)zirconiumdibromide,
Dimethylsilylbis(1-methyl,4-butylcyclopentadienyl)zirconiumdifluoride,
Dimethylsilylbis(1-methyl,4-butylcyclopentadienyl)zirconiumdiamide,
Dimethylsilylbis(1-methyl,4-butylcyclopentadienyl)zirconiumdimethoxide,
Dimethylsilylbis(1-methyl,4-butylcyclopentadienyl)zirconiumdibenzyl,
Dimethylsilylbis(1-methyl,4-ethylcyclopentadienyl)zirconiumdichloride,
Dimethylsilylbis(1-methyl,4-ethylcyclopentadienyl)zirconiumdimethyl,
Dimethylsilylbis(1-methyl,4-benzylcyclopentadienyl)zirconiumdichloride,
Dimethylsilylbis(1-methyl,4-benzylcyclopentadienyl)zirconiumdimethyl,
Dimethylsilylbis(1-methyl,3-butylcyclopentadienyl)zirconiumdichloride,
Dimethylsilylbis(1-methyl,3-butylcyclopentadienyl)zirconiumdimethyl,
Dimethylsilylbis(1-methyl,3-n-propylcyclopentadienyl)zirconiumdichloride,
Dimethylsilylbis(1-methyl,3-n-propylcyclopentadienyl)zirconiumdimethyl,
Dimethylsilylbis(1-methyl,3-iso-propylcyclopentadienyl)zirconiumdichloride,
Dimethylsilylbis(1-methyl,3-iso-propylcyclopentadienyl)zirconiumdimethyl,
Dimethylsilylbis(1,3-dimethylcyclopentadienyl)zirconiumdichloride,
Dimethylsilylbis(1,3-dimethylcyclopentadienyl)zirconiumdimethyl,
Dimethylsilylbis(n-propylcyclopentadienyl)zirconiumdichloride,
Dimethylsilylbis(n-propylcyclopentadienyl)zirconiumdimethyl,
Dimethylsilylbis(n-butylcyclopentadienyl)zirconiumdichloride,
Dimethylsilylbis(n-butylcyclopentadienyl)zirconiumdimethyl,
Dimethylsilylbis(tert-butylcyclopentadienyl)zirconiumdichloride,
Dimethylsilylbis(tert-butylcyclopentadienyl)zirconiumdimethyl,
Dimethylsilylbis(benzylcyclopentadienyl)zirconiumdichloride,
Dimethylsilylbis(benzylcyclopentadienyl)zirconiumdimethyl,
Dimethylsilylbis(benzylcyclopentadienyl)(pentamethylcyclopentadienyl)zirconiumdimethyl,
Dimethylsilylbis(benzylcyclopentadienyl)(pentamethylcyclopentadienyl)zirconiumdichloride,
Dimethylsilylbis(propylcyclopentadienyl)(pentamethylcyclopentadienyl)zirconiumdimethyl,
Dimethylsilylbis(propylcyclopentadienyl)(pentamethylcyclopentadienyl)zirconiumdichloride,
Dimethylsilylbis(propylcyclopentadienyl)(tetramethylcyclopentadienyl)zirconiumdimethyl,
Dimethylsilylbis(propylcyclopentadienyl)(tetramethylcyclopentadienyl)zirconiumdichloride,
Dimethylsilylbis(tetramethyl,propylcyclopentadienyl)(pentamethylcyclopentadienyl)zirconimdimethyl,
Dimethylsilylbis(tetramethyl,propylcyclopentadienyl)(pentamethylcyclopentadienyl)zirconimdichloride,
Dimethylsilylbis(tetramethyl,propylcyclopentadienyl)(cyclopentadienyl)zirconiumdimethyl,
and
Dimethylsilylbis(tetramethyl,propylcyclopentadienyl)(cyclopentadienyl)zirconiumdichloride.

Activators

The catalyst systems described herein may act as an activator and may also further comprise an additional activator.

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Particular activators include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). In one aspect, an alkylalumoxane is not required in the catalyst system.

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Other ranges may include from 1:1 to 1000:1, such as 1:1 to 500:1. For instance, activator may be employed at any one of about 500, 450, 400, 350, 300, 250, 200, 150, 100, 50, 25, and 1 mole(s) or less, per mole catalyst compound.

In an alternate embodiment, little or no alumoxane is used in the polymerization processes described herein. In particular, alumoxane may be present at zero mole %.

In addition or instead, catalyst systems of this invention can include at least one non-coordinating anion (NCA) activator, as defined previously. Non-coordinating anions useful in accordance with this invention are those that are compatible, stabilize the transition metal cation in the sense of balancing its ionic charge at +1, and yet retain sufficient lability to permit displacement during polymerization.

In a preferred embodiment boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d-; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. In particular embodiments, $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted C1 to C40 hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d+}$ includes those having the formula $[M^{k+}Q_n]^{d-}$ wherein k is 1, 2, or 3; n is 1, 2, 3, 4, 5, or 6 (preferably 1, 2, 3, or 4); n–k=d; M is an element selected from Group 13 of the Periodic Table of the Elements, preferably boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated by reference herein.

Most preferably, the ionic stoichiometric activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

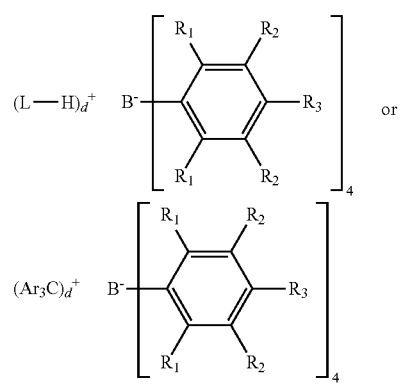

where: each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si-$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si-$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is an neutral Lewis base; $(L-H)^+$ is a Bronsted acid; d is 1, 2, or 3; wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

TABLE 1

Relative Volumes

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators, please see U.S. Pat. No. 8,658,556, which is incorporated by reference herein. Particular examples of suitable NCA activators include:
N,N-dimethylaninlium tetrakis(pentafluorophenyl)borate;
N,N-dimethylanilinium tetrakis(perfluoronaphthyl)borate;
N,N-dimethylanilinium tetrakis(perfluorobiphenyl)borate;
N,N-dimethylanilinium tetrakis(3,5-bis(trifluoromethyl)phenyl)borate;
triphenylcarbenium tetrakis(perfluoronaphthyl)borate;
triphenylcarbenium tetrakis(perfluorobiphenyl)borate;
triphenylcarbenium tetrakis(3,5-bis(trifluoromethyl)phenyl)borate;
triphenylcarbenium tetrakis(perfluorophenyl)borate;
$[Ph_3C^+][B(C_6F_5)_4^-]$; $[Me_3NH^+][B(C_6F_5)_4^-]$;
1-(4-(tris(pentafluorophenyl)borate)-2,3,5,6-tetrafluorophenyl)pyrrolidinium;
tetrakis(pentafluorophenyl)borate;
4-(tris(pentafluorophenyl)borate)-2,3,5,6-tetrafluoropyridine;
bis($C_4$-$C_{20}$alkyl)methylammonium tetrakis(pentafluorophenyl)borate; and
bis(hydrogenated tallowalkyl)methylammonium tetrakis(pentafluorophenyl)borate.

In another embodiment, one or more of the NCAs is chosen from the activators described in U.S. Pat. No. 6,211,105.

In an alternate embodiment, little or no NCA is used in the polymerization processes described herein. In particular, NCA may be present at zero mole %.

Any of the activators described herein, may optionally be mixed together before or after combination with the catalyst compound, preferably before being mixed with one or more catalyst compounds.

In some embodiments, the same activator or mix of activators may be used for combinations of catalyst compounds. In other embodiments, however, different activators or mixtures of activators may be used for each catalyst compounds.

Further, the typical activator-to-catalyst ratio for each of the catalysts (e.g., all activators-to-catalyst or all activators-to-catalysts ratio) is a 1:1 molar ratio. Alternate preferred ranges include from 0.1:1 to 100:1. For instance, activator-to-catalyst ratio may be any one of about 0.5, 1, 2, 5, 10, 50, 75, 100, 200, 250, 300, 350, 400, 450, 500, 600, 700, 800, 900, and 1000 to 1. According to some embodiments, activator-to-catalyst ratio may be within a range between any two of the foregoing.

In some embodiments, the activator(s) is/are contacted with a catalyst compound to form the catalyst system comprising activated catalyst and activator or other charge-balancing moiety, before the catalyst system is contacted with one or more monomers. In other embodiments, the activator(s) may be co-fed to catalyst compound(s) together with one or more monomers. In embodiments wherein two or more catalyst systems are utilized in one polymerization zone (e.g., in a process using a multiple catalyst system as described in more detail below, such as a dual catalyst system), each of the catalyst compounds may be contacted with their respective activator(s) (which, again, may be the same or different) before being mixed together. Where the same activator is used for each, a mixture of catalyst may be contacted with activator (either before or along with feeding of monomers to the catalyst mixture).

In an alternate embodiment, the catalyst system may be absent of additional activator, e.g., alumoxane and non-coordinating anion activators.

This invention relates to catalyst systems comprising alkyl aluminum treated layered silicate supports. The layered silicate may be an ion exchanged layered silicate.

Preferred ion-exchange layered silicate useful in the present invention are silicate compounds having a crystal structures wherein layers formed by strong ionic and covalent bonds are laminated in parallel with weak ionic bonding, and the ions contained between the layers are exchangeable. Most ion-exchange layered silicates naturally occur as the main component of clay minerals, but these ion-exchange layered silicates may be artificially synthesized materials. Preferred ion-exchange layered silicates useful in this invention include natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials (such as ITQ-2, MCM-22, and ferrierite precursors) and mixtures thereof. In a preferred embodiment, the ion-exchange layered silicate is acidified by contacting with an acid (such as sulfuric acid, hydrochloric acid, a carboxylic acid, an amino acid, or the like).

Preferred ion-exchange layered silicates useful in this invention include those having a 1:1 type structure or a 2:1 type structure. Examples of the ion-exchange layered silicate include layered silicates having a 1:1 type structure or a 2:1 type structure as described in "Clay Mineralogy" written by R. E. Grim (published by McGraw Hill in 1968) and "Chemistry of Clays and Clay Minerals" written by A. C. Newman (published by John Wiley and Sons: New York in 1987). The 1:1 type structure is a structure formed by laminating 1:1 layered structures having one layer of tetrahedral sheet and one layer of octahedral sheet combined as described in the above literature "Clay Mineralogy", and the 2:1 type structure is a structure formed by laminating 2:1 layered structures having one layer of octahedral sheet sandwiched between two layers of tetrahedral sheets. Examples of ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizardite, antigorite or the like. Examples of ion-exchange layered silicate comprising the 2:1 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. Mixed layer silicates are also included. In some embodiments, an ion-exchange layered silicate having the 2:1 type structure is preferable. In another preferred embodiment, a smectite group silicate is used and in a particularly preferable example the ion exchange layered silicate comprises montmorillonite.

Kinds of exchangeable cations (a cation contained between layers of an ion-exchange layered silicate) are not specially limited, but the cations are preferably a metal of Group 1 of the Periodic Table of the Elements such as sodium or potassium, a metal of Group 2 of the Periodic Table of the Elements such as calcium or magnesium, or a transition metal such as iron, cobalt, copper, nickel, zinc, ruthenium, rhodium, palladium, silver, iridium, platinum or gold, which are relatively easily available as industrial starting materials.

In some embodiments, the ion-exchange layered silicate has an average particle size of from 0.02 to 200 microns, preferably from 0.25 to 100 microns, even more preferably 0.5 to 50 microns. In some embodiments, the ion exchange layered silicates have a bi-modal distribution, or even multi-modal distribution, of particle sizes. (Particle size, also referred to as "average particle size," "particle diameter," or "average particle diameter," is determined using a Mastersizer™ 3000 (range of 1 to 3500 µm) available from Malvern Instruments, Ltd. Worcestershire, England.)

The ion-exchange layered silicate may be used in a dry state and/or may be used also in a slurry state in liquid. Also, the shape of the ion-exchange layered silicate is not specially limited, and the shape may be a naturally occurring shape, an artificially synthesized shape or a shape of an ion-exchange layered silicate obtained after subjected to pulverizing, granulating and classifying. Among these shapes, it is preferable to use a granulated ion-exchange layered silicate since such an ion-exchange layered silicate used as a catalyst component provides satisfactory polymer particle properties.

In some embodiments, the ion-exchange layered silicates are used in the absence of other support type compounds. Likewise, in other embodiments the ion exchange layered silicates are combined with other support type compound and used in this invention. For example, an ion exchange layered silicate, such as montmorillonite, may be combined with silica then combined with the organoaluminum agent(s) described herein. In another embodiment, the ion-exchange layered silicate may be utilized as part of an agglomerate (as described in US 2003/0096698 A1 and U.S. Pat. No. 6,559,090 B1 and are herein fully incorporated by reference), with at least one inorganic oxide component selected from $SiO_2$, $Al_2O_3$, MgO, $AlPO_4$, $TiO_2$, $ZrO_2$, or $Cr_2O_3$.

Processing of a shape of an ion-exchange layered silicate by granulating, pulverizing or classifying may be carried out before chemical treatment (that is, the ion-exchange layered silicate having a shape previously processed may be subjected to the chemical treatment), or an ion-exchange layered silicate may be subjected to processing of a shape after chemical treatment. Processing may occur before or after chemical treatment with an organoaluminum compound and/or treatment with a polymerization catalyst.

Examples of a granulation method used herein include a stirring granulation method, a spraying granulation method, a tumbling granulation method, a bricketing granulation method, a compacting granulation method, an extruding granulation method, a fluidized layer granulation method, an emulsifying granulation method, a suspending granulation method a press-molding granulation method, and the like, but the granulation method is not limited thereto. Preferable examples include a stirring granulation method, a spraying granulation method, a tumbling granulation method and a fluidizing granulation method, and particularly preferable examples include a stirring granulation method and a spraying granulation method.

When carrying out the spraying granulation method, examples of a dispersion medium used for a starting slurry include water or an organic solvent such as methanol, ethanol, chloroform, methylene chloride, pentane, hexane, heptane, toluene, xylene or the like. Preferably, water is used as a dispersion medium. A concentration of the ion-exchange layered silicate in a starting material slurry for the spraying granulation method producing sphere particles is from 0.1 to 70%, preferably from 1 to 50 wt %, more preferably from 5 to 30 wt %. An entrance temperature of hot air used in the spraying granulation method producing sphere particles varies depending on a dispersion medium used, but it is from 80 to 260° C., preferably from 100 to 220° C., when water is used as a dispersion medium.

Also, in the granulation step, an organic material, an inorganic solvent, an inorganic salt, various binders and the like may be used. Examples of the binders include sugar, dextrose, corn syrup, gelatin, glue, carboxymethylcelluloses, polyvinyl alcohol, water-glass, magnesium chloride, aluminum sulfate, aluminum chloride, magnesium sulfate, alcohols, glycol, starch, casein, latex, polyethylene glycol, polyethylene oxide, tar, pitch, alumina sol, silica gel, gum arabic, sodium alginate, and the like.

Also, a particle size of a granulated ion-exchange layered silicate is in a range of from 0.1 to 1000 µm, preferably 1 to 500 µm is useful in this invention. Also, the pulverizing method is not specially limited, and it may be either dry type pulverization or wet type pulverization.

Particularly useful supports include magnesia, titania, zirconia, montmorillonite (EP 0 511 665), phyllosilicate, zeolites, talc, clays (U.S. Pat. No. 6,034,187) and the like. Other useful supports include magnesia, titania, zirconia, magnesium chloride (U.S. Pat. No. 5,965,477), and montmorillonite (EP 0 511 665).

Chemical Treatment of Ion-Exchange Layered Silicate

The chemical treatment of an ion-exchange layered silicate is carried out by bringing it in contact with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called a guest. Among these treatments, acid treatment or salt treatment is particularly preferable.

A common effect achieved by chemical treatment is to exchange an intercalation cation with other cations, and in addition to this effect, the following various effects can be achieved by various chemical treatments. For example, acid treatment removes impurities on the surface of silicate, and cations such as Al, Fe, Mg, or the like in a crystal structure are eluted, thereby increasing the surface area. This treatment enhances the acid strength and acidity of the layered silicate.

Alkali treatment destroys a crystal structure of a clay mineral, and changes a structure of the clay mineral. Also, intercalation or salt treatment forms an ion composite, a molecule composite, an organic derivative or the like, and changes a surface area or a distance between layers. By using an ion-exchange reaction, an exchangeable intercalated cation between layers can be replaced by other large bulky ions, thereby producing a layered material having the distance between layers enlarged. Thus, the bulky ions have a function as a column supporting the layered structure, and are called pillars.

In a preferred embodiment, ion-exchange layered silicates, have one or more of the following features (as described in U.S. Pat. No. 6,531,552 B2 and US 2003/0027950 A1 and hereby fully incorporated by reference):
(1) an amount of acid sites having a pKa of −8.2 or less of 0.05 mmol/g (where the amount is equivalent to the mmol/g of 2,6-dimethylpyridine consumed for neutralization),
(2) performance that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≥0.8,
(3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)−(c)>25 (cc/g),
(4) a pore size distribution curve calculated from the desorption isotherm by nitrogen adsorption-desorption method, a pore diameter $D_m$ showing a maximum peak intensity $D_{VM}$ from 60 to 200 Å,
(5) in a pore size distribution curve calculated from desorption isotherm by nitrogen adsorption-desorption method, a pore diameter $D_{m1/2}$(Å) on the smaller pore size side corresponding to a ½ peak intensity of the maximum peak intensity $D_{VM}$ has a relation of $D_{m1/2}/D_m$ of at least 0.65 and less than 1, provided that the largest value is employed when there are a plurality of $D_{m1/2}$ values, and/or
(6) an average crushing strength of at least 3 MPa as measured by a minute compression tester.

(1) Acid Strength/Acid Site Density

The term "acid" used herein is one category classifying a material, and is defined as a material of Bronsted acid or Lewis acid. Also, the term "acid site" is defined as a constituting unit of a material exhibiting a property as an acid, and for the present invention, its amount is analyzed by the method described in U.S. Pat. No. 6,531,552 and is hereby fully incorporated by reference. When a chemically treated ion-exchange layered silicate is used as the support or carrier, the amount of a specific acidity is measured with regard to a silicate obtained after the chemical treatment.

In one embodiment, the ion-exchange layered silicate is acidic in nature as determined by titration methods as outlined in U.S. Pat. No. 6,531,552, which is hereby fully incorporated by reference.

In another embodiment, it is important to control an acidity and amount of acid sites, so as to afford an ion-exchange layered silicate that contains aluminum in an atomic ratio of Al/Si in a range of from 0.05 to 0.4, preferably from 0.05 to 0.25, more preferably from 0.07 to 0.23. The Al/Si atomic ratio is regarded as an index of acid treatment of the clay constituent. Furthermore, the chemically treated ion-exchange layered silicate having an acid site of at most −8.2 pKa, with the amount of acid site being equivalent to at least 0.05 mmol/g of 2,6-dimethylpyridine consumed for neutralization (as described in U.S. Pat. No. 6,531,552 B2) is useful. In general, the preferred amount of acid sites present in the ion-exchange layered silicate is 0.05 mmol/g or more and the amount of acid sites is preferably as high as possible.

(2) Performance in Nitrogen Adsorption/Desorption Isotherm

In the present invention, measurement of the adsorption and desorption isotherm by nitrogen adsorption-desorption method are carried out in accordance with the Brunauer-Emmett-Teller (BET) method using adsorption-desorption of nitrogen (temperature of liquid nitrogen, 77 K) with a Micromeritics Tristar II 3020 instrument after degassing of the powders for 4 hrs at 350° C. More information regarding the method can be found, for example, in "Characterization of Porous Solids and Powders: Surface Area, Pore Size and Density", S. Lowell et al., Springer, 2004.

In general, the nitrogen adsorption-desorption isotherms for ion-exchange layered silicates exhibit an adsorption hysteresis. Detailed descriptions of adsorption-desorption fundamentals, including hysteresis, are discussed in "Adsorption Technology and Design" by Crittenden and Thomas and is incorporated by reference.

In one embodiment, the chemically treated ion-exchange layered silicate performance in the nitrogen adsorption-desorption isotherm exhibits a hysteresis.

In a preferred embodiment, the ion-exchange layered silicate exhibits the following performance in the nitrogen adsorption-desorption isotherm: that in desorption isotherm by nitrogen adsorption-desorption method, a ratio of a remaining adsorption amount (b) at a relative pressure P/Po=0.85 to an adsorption amount (a) at a relative pressure P/Po=1 satisfies the formula, (b)/(a)≥0.8, (3) performance that in adsorption isotherm and desorption isotherm by nitrogen adsorption-desorption method, a difference between a remaining adsorption amount (b) at a relative pressure P/Po=0.85 and an adsorption amount (c) in adsorption isotherm at a relative pressure P/Po=0.85 satisfies the formula, (b)−(c)>25 (cc/g).

Examples of the analyzing apparatus include commercially available products such as Autosorb of Quantachrome Company or Omnisorp of Coulter Inc. or the like.

(3) Pore Size Distribution

The evaluation of the pore size distribution in the present invention employs the desorption isotherm. The desorption isotherm is a curve obtained while reducing the relative pressure. The desorption isotherm shows a lower relative pressure to the same desorbed gas amount as compared with adsorption isotherm, and consequently shows a lower free energy state, and is generally considered to be closer to a state of real thermodynamic stability.

In one embodiment, an ion-exchange layered silicate with any pore size and or any pore size distribution may be used.

In another embodiment, included in this invention is the preferred pore size distributions of the ion-exchange layered silicate as described in US 2003/0027950 A1 (which is fully incorporated here by reference) and listed above in "features" 4 and 5. Where $D_m$ (from differential values of pore volumes) represents a pore size diameter showing a maximum peak intensity and is generally expressed as "most frequently appearing pore diameter", $D_{VM}$ represents a maximum peak intensity and $D_{m1/2}$ represents a pore size diameter on the smaller diameter side corresponding to a point, the peak intensity of which is ½ of the maximum peak intensity. A pore diameter $D_{m1/2}$ is present at least one respectively on both sides of $D_m$, i.e., on the larger diameter side of $D_m$ and on the smaller diameter side of $D_m$, but a value on the smaller diameter side is taken as the $D_{m1/2}$ value in the present invention. Also, if there are a plurality of $D_{m1/2}$ values on the smaller diameter side, the largest value is employed for calculation. In one embodiment, the $D_{m1/2}/D_m$ can range from 0.1 to 0.9. In another embodiment, a $D_{m1/2}/D_m$ value is preferably at least 0.68, more preferably at least 0.70. Furthermore, a pore size distribution curve calculated from desorption isotherm by nitrogen adsorption-desorption method, a pore diameter $D_{m1/3}$(Å) on the smaller pore size side corresponding to a ⅓ peak intensity of the maximum peak intensity $D_{vm}$ has a relation of $D_{m1/3}/D_m$ of at least 0.55 and less than 1, provided that the largest value is employed when there are a plurality of $D_{m1/3}$ values. In an analogous manner as $D_{m1/2}$, a pore diameter $D_{m1/3}$ value is present respectively on both sides of $D_m$, i.e., at least one on the larger diameter side of $D_m$ and at least one on the smaller diameter side of $D_m$, but a value on the smaller diameter side is defined as $D_{m1/3}$. Also, when there are a plurality of $D_{m1/3}$ values on the smaller diameter side, the largest value is employed for calculation. A $D_{m1/3}/D_m$ value is preferably at least 0.56, more preferably at least 0.57. If the $D_{m1/3}/D_m$ value is less than 0.56, a considerable amount of smaller diameter pores are present, which is not preferred.

Moreover, the pore size distribution calculated for desorption isotherm by nitrogen adsorption-desorption method is a substantially unimodal peak. That is, there is not present a second peak, and if it is present, its intensity is at most 50%, preferably at most 40%, particularly at most 30% of a maximum peak intensity $D_{VM}$.

Also, the pore size distribution curve calculated from desorption isotherm by nitrogen adsorption-desorption method, wherein a peak intensity at a pore diameter of 50 Å is defined as $D_{V50A}$, $D_{V50A}/D_{VM}$ is at least 0.01 and at most 0.40, preferably at least 0.03 and at most 0.38, more preferably at least 0.05 and at most 0.36. If the $D_{V50A}/D_{VM}$ value exceeds 0.38, a considerable amount of smaller diameter pores are contained.

Thus, an ion-exchange layered silicate may have a predetermined pore size, but its pore size is sufficiently large to accept a metallocene complex, an activator, an organoaluminum compound, and a monomer. Accordingly, these compounds participating in the reaction easily enter into pores in respective stages of formation of a catalyst, activation, prepolymerization and polymerization, and complexes are highly dispersed in carriers, and consequently metallocene catalyst active sites are thought to be uniformly formed. In a preferred embodiment the ion exchange layered silicate has a pore size that is sufficiently large enough that the catalyst compound, the organoaluminum and activator compounds may freely enter and diffuse evenly within the particle. Preferred pore sizes include 40 Angstroms to 500 Angstroms, preferably 50 Angstroms to 300 Angstroms, more preferably 70 to 200 Angstroms.

(4) Carrier Strength

In one embodiment, the ion exchange layered silicate have a compression fracture strength (also called average crushing strength) as measured by a minute compression tester. Preferably the ion exchange layered silicate has a compression fracture strength of 3 to 20 MPa. Preferably, the average crushing strength is at least 5 MPa, more preferably at least 7 MPa. In addition, the upper limit of the ion exchange layered silicate strength is preferably an average crushing strength of at most 20 MPa, more preferably at most 18 MPa.

Olefin Polymerization Catalyst System

In the present invention, an olefin polymerization catalyst system can be prepared by contacting the aluminum vinyl transfer agent (AVTA) composition described herein with a catalyst compound (also called catalyst precursor compounds, pre-catalyst compounds or catalyst precursors). In one embodiment, a supported catalyst system may be prepared, generally, by the reaction of the aluminum vinyl transfer agent compound composition with the addition of a catalyst compound (such as a metallocene compound), followed by addition of an ion-exchange layered silicate. Alternately, a supported catalyst system may be prepared, generally, by the reaction of the aluminum vinyl transfer agent composition, an ion-exchange layered silicate, and then adding one or more catalyst compounds.

In a preferred embodiment the ion exchange layered silicate is combined with the aluminum vinyl transfer agent composition and thereafter is combined with the catalyst compound.

Contact between an ion-exchange layered silicate and an aluminum vinyl transfer agent composition and/or catalyst compound can be carried out under an inert gas atmosphere such as nitrogen in a solvent of an inert hydrocarbon such as hexane, heptane, pentane, cyclohexane, benzene, toluene, xylene or the like, and the solvent may be used alone or in a mixture of two or more.

An amount of an aluminum vinyl transfer agent compound composition used is preferably from 0.01 to 1000 mmol, more preferably from 0.1 to 100 mmol, per 1 g of an ion-exchange layered silicate.

A concentration of an ion-exchange layered silicate in a solvent is preferably from 0.001 to 100 g/mL, more preferably form 0.01 to 10 g/mL, and a concentration of an aluminum vinyl transfer agent composition is preferably from 0.001 to 100 mmol/mL, more preferably from 0.01 to 10 mmol.

Contacting may be carried out by dispersing an ion-exchange layered silicate in a solvent and then bringing an aluminum vinyl transfer agent composition in contact therewith. Alternatively, contacting may be carried out by adding an aluminum vinyl transfer agent composition to a solvent and then dispersing an ion-exchange layered silicate therein.

The contacting treatment is carried out generally at a temperature of from −50° C. to a boiling point of a solvent, preferably from 0° C. to a boiling point of a solvent. The contacting time is from 1 minute to 48 hours, preferably from 1 minute to 24 hours.

The order of contacting an aluminum vinyl transfer agent composition with an ion-exchange layered silicate is not specially limited as far as the object of the present invention is achieved, but it is more effective to carry out the contacting treatment after chemical treatment of the silicate or preferably after drying carried out after the chemical treatment.

Also, the order of contacting treatment step of an aluminum vinyl transfer agent composition and an ion-exchange layered silicate and the granulation step of an ion-exchange layered silicate is not specially limited as far as the object of the present invention is achieved, but it is preferable to carry out the treatment with an aluminum vinyl transfer agent composition after granulating the silicate.

Further, it is possible to enhance the effect of the present invention by combining the above-mentioned respective treatments. Thus, after controlling a particle size distribution and a carrier particle strength by granulating an ion-exchange layered silicate, a carrier obtained through the following Step 1 and Step 2 (see below) is used as a catalyst component for olefin polymerization.

Step 1: after granulating an ion-exchange layered silicate, the silicate is treated with an acid.

Step 2: after carrying out step 1, the silicate is treated with an aluminum vinyl transfer agent composition which is any aluminum vinyl transfer agent from the discussion above.

A metallocene can be added with, prior to, or after the silicate is treated with a metal hydrocarbyl transfer agent.

Polymerization Process and Olefin Monomers

The aluminum vinyl transfer agents of the invention and catalyst systems utilizing the aluminum vinyl transfer agents described above are suitable for use in any prepolymerization and/or polymerization process over a wide range of temperatures and pressures. The temperatures may be in the range of from −60° C. to about 280° C., preferably from 50° C. to about 200° C. In another embodiment, the polymerization temperature is above 0° C., above 50° C., above 80° C., above 100° C., above 150° C. or above 200° C. In one embodiment the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefin(s) at least one of which is ethylene or propylene.

In one embodiment, the process of the invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In another embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to polymerization process, particularly a gas phase or slurry phase process, for polymerizing propylene alone or with one or more other monomers including ethylene, and/or other olefins having from 3 to 12 carbon atoms.

In embodiments of the process of this invention, the catalyst system may be employed in liquid phase (solution, slurry, suspension, bulk phase or combinations thereof), in high pressure liquid, or supercritical fluid or gas phase processes. Each of these processes may be employed in single, parallel or series reactors. The liquid processes comprise contacting the ethylene and/or α-olefin and at least one vicinally disubstituted olefin monomer with the catalyst system described herein in a suitable diluent or solvent and allowing the monomers to react for a sufficient time to produce embodiments of the invention copolymers. One or more of the monomers used in the polymerization may be utilized as a solvent and/or diluent, generally in homogeneous polymerizations in the liquid monomer or monomers. Hydrocarbyl solvents are also suitable, both aliphatic and aromatic, including hexane and toluene. Bulk and slurry processes may typically be accomplished by contacting the catalysts with a slurry of liquid monomer, the catalyst system being supported. Gas phase processes may use the supported catalyst and may be conducted in any manner known to be suitable for producing ethylene homopolymers or copolymers via coordination polymerization. Illustrative examples may be found in U.S. Pat. Nos. 4,543,399; 4,588,790; 5,028,670; 5,382,638; 5,352,749; 5,436,304; 5,453,471; 5,463,999; and WO 95/07942. Each is incorporated by reference for purposes of US patent practice.

Generally, the polymerization reaction temperature may vary from −50° C. to 250° C. The reaction temperature conditions may be from −20° C. to 220° C., or below 200° C. The pressure may vary from 1 mm Hg to 2500 bar, or from 0.1 bar to 1600 bar, or from 1.0 to 500 bar. Where lower molecular weight copolymers, e.g., $M_n \leq 10,000$, are sought, it may be suitable to conduct the reaction processes at temperatures above 0° C. and pressures under 500 bar.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva, and J. C. Pinto, Ind. Eng. Chem. Res., 29, 2000, 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

A heterogeneous polymerization is one where the polymer product is not soluble in the reaction media, such as gas phase polymerization or slurry phase polymerization.

Polymer Products

The polymers produced by the process of the invention can be used in a wide variety of products and end-use applications. The polymers produced can be homo- and copolymers of ethylene and propylene and include linear low density polyethylene, elastomers, plastomers, high-density polyethylenes, medium density polyethylenes, low density polyethylenes, polypropylene and polypropylene copolymers. Polymers, typically ethylene based copolymers, have a density of from 0.86 g/cc to 0.97 g/cc; density being measured in accordance with ASTM-D-1238. Propylene based polymers produced include isotactic polypropylene, atactic polypropylene and random, block or impact copolymers.

The polymers of embodiments of the invention may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. Additionally, copolymer of embodiments of the invention will comprise a molecular weight distribution (Mw/Mn) in the range of $\geq 1$, or $\geq 1.5$ or $\leq 6$, or $\leq 4$ or $\leq 3$, preferably from greater than 1 to 40, alternatively from 1.5 to 20, alternatively from 1.5 to 10, alternatively from 1.6 to 6, alternatively from 1.5 to 4, or alternatively from 2 to 3.

Preferred propylene polymer, preferably homopolymer, produced herein has an Mw of 20,000 up to 2,000,000 g/mol.

For higher molecular weight applications, preferred polymer, preferably homopolymer, produced herein has an Mw of 20,000 up to 2,000,000 g/mol, alternately 50,000 to 1,500,000 g/mol, alternately 100,000 to 1,300,000 g/mol, alternately 300,000 to 1,300,000 g/mol, alternately 500,000 to 1,300,000 g/mol.

Mn is number average molecular weight, Mw is weight average molecular weight, and Mz is z average molecular weight. Molecular weight distribution (MWD) is defined to be Mw divided by Mn. Unless otherwise noted, all molecular weight units (e.g., Mw, Mn, Mz) are g/mol.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the invention and blends thereof are useful in such forming operations as film, sheet, and fiber extrusion and co-extrusion as well as blow molding, injection molding, roto-molding. Films include blown or cast films formed by coextrusion or by lamination useful as shrink film, cling film, stretch film, sealing film or oriented films.

EXAMPLES

Montmorillonite KSF was purchased from Sigma-Aldrich.

Methylalumoxane, 30 wt % in toluene, was purchased from Albemarle and used as received.

Trimethyl aluminum, triethyl aluminum and tri-n-octyl aluminum (TnOAl) were purchased Akzo Nobel and used as received. (1,3-Me-nBuCp)$_2$ZrCl$_2$ (Complex A) and rac-Me$_2$Si(H$_4$Ind)$_2$ZrCl$_2$ (Complex D) were purchased from Albermarle. These catalyst precursors were converted to dimethyl complexes via reaction with methyl Grignard reagent.

Syntheses of Aluminum Alkenyl

Synthesis of Diisobutyl(oct-7-en-1-yl) aluminum, $^i$Bu$_2$Al(Oct=) (1).

A neat 1,7-octadiene (16.53 g, 150 mmol) was added drop wise to DIBAL-H (3.56 g, 25 mmol) at room temperature over a period of 5 minutes. The reaction mixture was either stirred at 45° C. for overnight or refluxed at 110° C. for 1 hour to form the title compound, as indicated below. The excess 1,7-octadiene from the reaction mixture was removed under the flow of dry nitrogen at room temperature. The residual 1,7-octadiene was then removed in vacuo for 30 min to obtain a colorless viscous oil of 1 (5.713 g, 91%). The product formation was confirmed by $^1$H NMR spectroscopy and based on the relative integration the molecular formula was assigned as (C$_4$H$_9$)$_{2.1}$Al(C$_8$H$_{15}$)$_{0.9}$. $^1$H NMR (400 MHz, benzene-d$_6$): δ=5.78 (m, 1H, =CH), 5.01 (m, 2H, =CH$_2$), 1.95 (m, 4H, —CH$_2$), 1.54 (m, 2H, $^i$Bu-CH), 1.34 (m, 6H, —CH$_2$), 1.04 (d, 12H, $^i$Bu-CH$_3$), 0.49 (t, 2H, Al—CH$_2$), 0.27 (d, 4H, $^i$Bu-CH$_2$) ppm.

Synthesis of Isobutyldi(oct-7-en-1-yl)aluminum, $^i$BuAl(Oct=)$_2$ (2).

A neat 1,7-octadiene (9.00 g, 81.8 mmol) was added drop wise to DIBAL-H (0.81 g, 7.2 mmol) at room temperature over 5 minutes. The resulting mixture was stirred under reflux at 110° C. for 60 minutes and then continuously stirred at 70° C. overnight. The excess 1,7-octadiene from the reaction mixture was removed under the flow of dry nitrogen at room temperature. The residual 1,7-octadiene was then removed in vacuo for 30 minutes to obtain a colorless viscous oil of 2 (1.689 g, 79%). The product formation was confirmed by $^1$H NMR and based on the relative integration the molecular formula of was assigned as (C$_4$H$_9$)$_{1.15}$Al(C$_8$H$_{15}$)$_{1.85}$. $^1$H NMR (400 MHz, benzene-d$_6$): δ=5.81 (m, 2H, =CH), 5.05 (m, 4H, =CH$_2$), 2.03 (m, 8H, —CH$_2$), 1.59 (m, 1H, $^i$Bu-CH), 1.38 (m, 12H, —CH$_2$), 1.09 (d, 6H, $^i$Bu-CH$_3$), 0.51 (t, 4H, Al—CH$_2$), 0.31 (d, 2H, $^i$Bu-CH$_2$) ppm.

Reaction of DIBAL-H with 1,7-octadiene under mild conditions produces the mono-alkenyl aluminum complex 1 without the formation of triene side product. More robust reaction conditions were required to form the di-alkenyl aluminum complex 2, and care was taken to exclude the formation of the triene. Intermediate temperatures such at 70° C. for overnight or 110° C. for 1 hr produced the di-alkenyl aluminum complex 2 without formation of the triene. Higher temperatures or prolonged heating at intermediate temperatures resulted in the formation of the triene.

Syntheses of Catalyst Compounds

Synthesis of Complex B: Dimethylsilylene(2,3,4,5-tetramethylcyclopentadienyl) (indenyl)zirconium Dimethyl Lithium indenide (2.92 g, 23.9 mmol) was dissolved in 100 mL of THF. A THF solution of Me$_4$CpSiMe$_2$Cl (5.14 g, 23.9 mmol) was added to the solution. The solution was allowed to stir overnight. The reaction was then blown down, taken up in pentane and filtered through celite. The filtrate was then dried under vacuum to give 6.78 g of oil that was immediately taken to the next step.

The above oil (6.78 grams) was dissolved in diethyl ether and chilled to −35° C. $^n$BuLi (20.3 mL, 2.5 M, 50.75 mmol) was added dropwise, the solution was allowed to stir over the weekend. The solution was blown down and vacuum dried to remove the ether. The solid was washed with pentane and dried under vacuum to give 2.7859 g of solid with roughly 0.75 eq of ether still attached. 33.94% yield. NMR (THF-$d_8$) δ 0.549(s, br, 6H), 1.111(t, 4.61H, ether) 1.895(s, br, 6H) 2.103(s, br, 6H), 3.381(q, 3H, ether), 5.998(m, 1H), 6.439(m, br, 2H), 6.764(d, 1H), 7.306(d, br, 1H), 7.606(d, br, 1H).

$ZrCl_4$ (1.8197 g, 7.8085 mmol) was slurried in 50 mL of dichloromethane. The deprotanated ligand was added as a solid and washed down with 10 mL of diethyl ether, an additional 50 mL of dichloromethane was then added to the solution. The solution was stirred overnight. The mixture was filtered through celite, blown down, and dried under vacuum to give 2.7953 g of yellow solid, dimethylsilylene (2,3,4,5-tetramethylcyclopentadienyl) (indenyl)zirconium dichloride, 78.74% 1H NMR ($CD_2Cl_2$) δ 0.940(s, 3H), 1.138(s, 3H), 1.865(d, 6H), 1.913(s, 3H) 1.925(s, 3H), 5.986(d, 1H), 7.030(m, 1H), 7.171(br, 1H), 7.303(d, 2H), 7.65(d, 1H).

Dimethylsilylene(2,3,4,5-tetramethylcyclopentadienyl) (indenyl)zirconium dichloride, Complex B (2.7659 g, 6.0840 mmol) was dissolved in 100 mL of dichloromethane. MeMgBr (5 mL of 3.0M in ether, 15 mmol) was added to the reaction via syringe. The reaction was stirred overnight. The reaction was then filtered through celite; the solvent was removed. The product was dissolved in a toluene/pentane solution and again filtered through celite. Recrystallization from a toluene/pentane mixture gave 1.2776 g of material, 50.75% yield. $^1$H NMR ($C_6D_6$): δ −1.341ppm(s, 3H), −0.182(s, 3H), 0.472(s, 3H), 0.643(s, 3H), 1.614(s, 3H), 1.700(s, 3H, 1.815(s, 3H) 1.832(s, 3H), 5.547(d, 1H), 6.881 (t, 1H), 7.033(d, 1H), 7.175(d, 1H), 7.283(d, 1H), 7.6(d, 1H).

Synthesis of Complex C

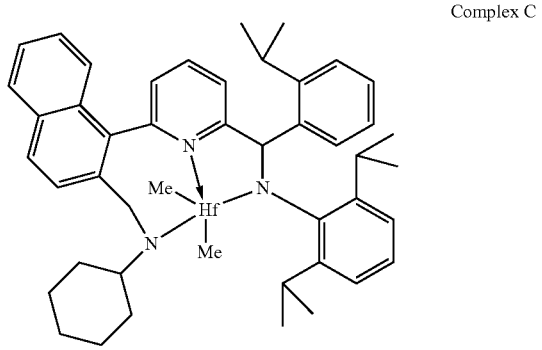

Complex C 4,4,5,5-Tetramethyl-2-(2-methyl-1-naphthyl)-1,3,2-dioxaborolane (1).

1,2-Dibromoethane (about 0.3 ml) was added to 6.10 g (0.25 mol) of magnesium turnings in 1000 cm$^3$ of THF. This mixture was stirred for 10 min, and then 55.3 g (0.25 mol) of 1-bromo-2-methylnaphtalene was added by vigorous stirring for 3.5 h at room temperature. Further on, 46.5 g (250 mmol) of 2-isopropoxy-4,4,5,5-tetramethyl-1,3,2-dioxaborolane was added in one portion. The resulting mixture was stirred for 15 min and then poured into 1000 cm$^3$ of cold water. The product was extracted with 3×300 ml of ethyl acetate. The organic layer was separated, washed by water, brine, dried over $MgSO_4$, and, finally, evaporated to dryness. The formed white solid was washed by 2×75 ml of pentane and then dried in vacuum. Yield 47.3 g (70%). Anal. calc. for $C_{17}H_{21}BO_2$: C, 76.14; H, 7.89. Found: C, 76.21; H, 7.96. $^1$H NMR ($CDCl_3$): δ 8.12 (m, 1H, 8-H), 7.77 (m, 1H, 5-H), 7.75 (d, J=8.4 Hz, 1H, 4-H), 7.44 (m, 1H, 7-H), 7.38 (m, 1H, 6-H), 7.28 (d, J=8.4 Hz, 1H, 3-H), 2.63 (s, 3H, 2-Me), 1.48 (s, 12H, $CMe_2CMe_2$).

2-[2-(Bromomethyl)-1-naphthyl]-4,4,5,5-tetramethyl-1,3,2-dioxaborolane (2).

A mixture of 47.3 g (176 mmol) of 4,4,5,5-tetramethyl-2-(2-methyl-1-naphthyl)-1,3,2-dioxaborolane, 33.0 g (185 mmol) of N-bromosuccinimide (NBS), and 0.17 g (0.70 mmol) of benzoyl peroxide in 340 ml of $CCl_4$ was stirred in argon atmosphere for 14 h at 75° C. The resulting mixture was cooled to room temperature, filtered through a glass frit (G3), and the filtrate was evaporated to dryness. This procedure gave 62.2 g (99%) of a beige solid. Anal. calc. for $C_{17}H_{20}BBrO_2$: C, 58.83; H, 5.81. Found: C, 58.75; H, 5.90. $^1$H NMR ($CDCl_3$): δ 8.30 (m, 1H, 8-H), 7.84 (d, J=8.3 Hz, 1H, 4-H), 7.79 (m, 1H, 5-H), 7.43-7.52 (m, 3H, 3,6,7-H), 4.96 (s, 2H, $CH_2Br$), 1.51 (s, 12H, $CMe_2CMe_2$).

Cyclohexyl{[1-(4,4,5,5-tetramethyl-1,3,2-dioxaborolan-2-yl)-2-naphthyl]methyl}amine (3).

A mixture of 18.0 g (181 mmol) of cyclohexylamine, 42.1 (129 mmol) g of 2-[2-(bromomethyl)-1-naphthyl]-4,4,5,5-tetramethyl-1,3,2-dioxaborolane, 18.4 g (133 mmol) of $K_2CO_3$, and 500 ml of dimethylformamide (DMF) was stirred for 12 h at 80° C. in argon atmosphere. The resulting mixture was poured into 1200 ml of water. The product was extracted with 3×200 ml of ethyl acetate. The combined extract was dried over $Na_2SO_4$ and then evaporated to dryness. An excess of cyclohexylamine was distilled off using the Kugelrohr apparatus. Yield 29.9 g (67%) of a dark red glassy solid. Anal. Calc for $C_{23}H_{32}BNO_2$: C 75.62; H 8.83; N 3.83. Found: C 75.69; H 8.79; N 3.87. $^1$H NMR ($CDCl_3$): δ 8.51 (m, 1H, 8-H in naphtyl), 7.76 (m 1H, 4-H in naphtyl), 7.69 (m, 1H, 5-H in naphtyl), 7.41-7.46 (m, 1H, 7-H in naphtyl), 7.35-7.39 (m, 1H, 6-H in naphtyl), 7.18 (m, 1H, 3-H in naphtyl), 4.16 (s, 2H, $CH_2$), 3.32 (m, 1H, NH), 1.56-1.67 (m, 5H, Cy), 1.37 (s, 12H, BPin), 1.15-1.25 (m, 5H, Cy), 0.94-1.06 (m, 1H, Cy).

6-{2-[(Cyclohexylamino)methyl]-1-naphthyl}pyridine-2-carbaldehyde (4).

A solution of 21.2 g (74.1 mmol) of $Na_2CO_3×10H_2O$ in 660 ml of water and 190 ml of methanol was purged with argon for 30 min. The obtained solution was added to a mixture of 29.9 g (80.0 mmol) of cyclohexyl{[1-(4,4,5,5-tetramethyl-1,3,2-dioxaborolan-2-yl)-2-naphthyl] methyl}amine, 14.0 g (80.0 mmol) of 6-bromopyridine-2-carbaldehyde, 4.62 g (4.00 mmol) of $Pd(PPh_3)_4$, and 780 ml of toluene in argon atmosphere. This mixture was refluxed for 10 h using a mechanical stirrer, then cooled to room temperature. The organic layer was separated, dried over Na$_2$SO$_4$, evaporated to 300 ml in volume, and then extracted with 3×300 ml of 2M HCl. The combined aqueous layer was alkalified to pH 10 by the saturated aqueous K$_2$CO$_3$, and then extracted with 3×200 ml of dichloromethane. The combined organic extract was dried over Na$_2$SO$_4$ and evaporated to dryness. Yield 23.1 g (84%) of a brown oil. Anal. Calc for C$_{23}$H$_{24}$N$_2$O: C 80.20; H 7.02; N 8.13. Found: C 80.78; H 7.11; N 8.01. $^1$H NMR (CDCl$_3$): δ 10.08 (s, 1H, CHO), 7.96-8.03 (m, 2H, 3-H, 4-H in Py), 7.83-7.89 (m, 2H, 8.5-H in Py), 7.59-7.64 (m, 2H, 5-H in Py and 4-H in naphtyl), 7.39-7.43 (m, 1H, 6-H in naphtyl), 7.30-7.34 (m, 1H, 7-H in naphtyl), 7.20-7.23 (m, 1H, 3-H in naphtyl), 3.56 (m, 2H, CH$_2$), 2.21 (m, 1H, 1-H in Cy), 1.57-1.66 (m, 4H, Cy), 1.02-1.11 (m, 4H, Cy), 0.88-0.96 (m, 2H, Cy).

N-[(1E)-(6-{2-[(Cyclohexylamino)methyl]-1-naphthyl}pyridin-2-yl)methylene]-2,6-diisopropylaniline (5).

A solution of 9.80 g (28.0 mmol) of 6-{2-[(cyclohexylamino)methyl]-1-naphthyl}pyridine-2-carbaldehyde, 5.55 g (31.0 mmol) of 2,6-diisopropylaniline, 0.1 g of toluenesulfonic acid (TsOH) in 100 ml of dry ethanol was refluxed for 10 h in argon atmosphere. The resulting mixture was cooled to room temperature and then evaporated to dryness. The residue was purified by flash chromatography on silica gel 60 (40-63 um, eluent: hexane-ethyl acetate-triethylamine=10:1:1, vol.). Yield 10.8 g (77%) of yellow powder. Anal. Calc for C$_{35}$H$_{41}$N$_3$: C 83.45; H 8.20; N 8.34. Found: C 83.59; H 8.06; N 8.41. $^1$H NMR (CDCl$_3$): δ 8.39 (m, 1H, 3-H in Py), 8.35 (s, 1H, CHN), 8.00 (m, 1H, 4-H in Py), 7.87-7.92 (m, 2H, 4,8-H in naphtyl), 7.63 (m, 1H, 3-H in naphtyl), 7.54 (m, 1H, 3-H in Py), 7.37-7.47 (m, 3H, 5-H in Py and 6,7-H in naphtyl), 7.09-7.17 (m, 3H, 3,4,5-H in naphtyl), 3.69 (m, 2H, CH$_2$N), 3.01 (sept, J=6.8 Hz, 2H, CH in 2,6-diisopropylphenyl), 2.29 (m, 1H, CH in Cy), 1.61-1.72 (m, 4H, Cy), 1.52-1.54 (m, 2H, Cy), 1.19 (d, J=6.8 Hz, 12H, CH$_3$ in 2,6-diisopropylphenyl), 1.09-1.11 (m, 2H, Cy), 0.94-0.99 (m, 2H, Cy).

N-[(6-{2-[(Cyclohexylamino)methyl]-1-naphthyl}pyridin-2-yl)(2-isopropylphenyl)methyl]-2,6-diisopropylaniline.

To a solution of 3.56 g (18.0 mmol) of 2-isopropylbromobenzene in 80 ml of THF 21.0 ml (35.7 mmol) of 1.7M $^t$BuLi in pentane was added at −80° C. in argon atmosphere. The resulting solution was stirred for 1 h at this temperature. Then, a solution of 3.00 g (6.00 mmol) of N-[(1E)-(6-{2-[(cyclohexylamino)methyl]-1-naphthyl}pyridin-2-yl)methylene]-2,6-diisopropylaniline in 20 ml of THF was added. The obtained mixture was stirred for 30 min at −80° C. Thereafter, 10 ml of water was added, and this mixture was warmed to room temperature. The resulting mixture was diluted with 100 ml of water, and crude product was extracted with 50 ml of ethyl acetate. The organic layer was separated, dried over Na$_2$SO$_4$, and evaporated to dryness. The residue was purified by flash chromatography on silica gel 60 (40-63 um, eluent: hexane-ethyl acetate-triethylamine=10:1:1, vol.). Yield 1.15 g (31%) of a yellow glassy solid. Anal. Calc for C$_{44}$H$_{53}$N$_3$: C 84.70; H 8.56; N 6.73. Found: C 84.86; H 8.69; N 6.55. $^1$H NMR (CDCl$_3$): δ 7.87 (m); 7.59-7.74 (m); 7.42-7.46 (m); 7.14-7.34 (m); 6.99 (m); 5.52 (d); 5.39 (d); 4.80 (m); 4.50 (m); 3.67 (m); 3.48-3.58 (m); 3.18 (m); 2.98 (m); 2.50-2.55 (m); 2.15(m); 2.25 (m); 1.48-1.72 (m); 1.03-1.15 (m); 0.98-1.01 (m); 0.91-0.93 (m); 0.79-0.86 (m).

While shielded from direct light, N-[(6-{2-[(Cyclohexylamino)methyl]-1-naphthyl}pyridin-2-yl)(2-isopropylphenyl)methyl]-2,6-diisopropylaniline (0.898 g, 1.44 mmol), Hf(NMe$_2$)$_2$Cl$_2$(dme) (0.616 g, 1.44 mmol), and toluene (20 mL) were combined and heated to 95° C. in a round bottomed flask that was uncapped to allow for the release of dimethylamine. After 3 h, the volatiles were evaporated under a stream of nitrogen to afford a yellow solid that was washed thoroughly with Et$_2$O to afford 1.11 g (1.27 mmol) of the dichloride complex. The dichloride intermediate was dissolved in CH$_2$Cl$_2$ (20 mL) and Me$_2$Mg in Et$_2$O (4.43 mL, 1.4 mmol) was added dropwise. After 30 minutes the volatiles were evaporated under a stream of nitrogen and the residue was dried thoroughly under reduced pressure. The residue was extracted with CH$_2$Cl$_2$ (10 mL) and filtered. Concentration of this solution to 1 mL followed by the addition of pentane (3 mL) caused the product to precipitate as a yellow microcrystalline solid. Yield 0.99 g, 83%. Room temperature $^1$H-NMR spectroscopic analysis indicated that the product was an 85:15 mixture of rotational diastereomers.

Support Syntheses:

Spray Dried Montmorillonite, Support 1

Support 1 was prepared by adding 2500 g of montmorillonite (K-10, Sigma-Aldrich) to 3.4 liters of deionized water. A homogeneous slurry, with an agglomerate size d$_{50}$ typically in the range of 15 μm, was achieved by stirring with a high-shear mixer for 60 min. Then 27 g of sodium silicate (reagent grade, Aldrich) were added to the mixture and homogenized for 5 min; achieving a final solids content of 30 wt. %. The obtained slurry was spray dried at a rate of 300 cc/min using a Bowen spray drier with an inlet temperature in the range of 716° F. and 1100° F. (380° C. and 593° C.), depending on feed flow, and a target outlet temperature of 320° F. (160° C.). The product was recovered as a dry, flowing powder with an agglomerate size d$_{50}$ between 90 and 150 μm, and moisture content between 17 and 6 wt %, depending on spray gas pressure. Finally, the support was dried further at 121° F. (250° C.) for 16 h and calcined in air at 932° F. (500° C.) for 8 h.

Sulfuric Acid Treated Montmorillonite KSF, Support 2

Montmorillonite KSF was then treated according to the general procedure of Example 1 of U.S. Pat. No. 7,220,695, i.e., Montmorillonite KSF (198.766 g) was placed in a 2 L round bottom flask along with 1.40 L of H$_2$O and 110 mL of concentrated sulfuric acid and stirred for 6 hr at 90° C. The mixture was then allowed to stir overnight at room temperature. The mixture was filtered and the solid was washed with 4×1 L of H$_2$O. The pH of the filtrate was monitored; when the pH was approximately 3 the washing was stopped and the solid was heated to 130° C. while open to air. The solid was then placed under vacuum at room temperature for a few hours and then heated to 150° C. under vacuum overnight. The clay was brought into a glovebox while maintaining a nitrogen atmosphere. A 132 gram amount of tan solid was obtained as Support 2.

Tri-n-octyl Aluminum Treated Montmorillonite KSF, Support 3

Support 2 (14.9 grams) was slurried in 100 mls of toluene. The slurry was sonicated for 5 minutes. Tri-n-octylaluminum (10.25 grams, 27.9485 mmol) was dissolved in 5 mLs of toluene and added to the slurry. The slurry was sonicated for an hour at 60° C. $^1$H NMR analysis of the solvent indicated excess tri-n-octyl aluminum in solution. The solid was filtered and washed three times with 50 mLs of toluene and once with pentane. The solid was dried under vacuum, yielding 15.6 grams of tan solid as Support 3.

$^i$Bu$_2$Al(Oct=) (1) treated Montmorillionite, Support 4

Support 1 (3.2227 g) was slurried in 20 mL of toluene. AliBu$_2$(oct-1-en-7-yl) (0.7138, 2.828 mmol) was added neat to the slurry. The Celstir was dropped at this point, resulting in some loss of material. The slurry was then stirred for 1 hr at 60° C. $^1$H NMR analysis showed an excess of the aluminum species. The slurry was then filtered, washed three times with 15 mL each of toluene, washed twice with pentane, and then dried under vacuum to give 2.8823 g of tan solid.

$^i$BuAl(Oct=)$_2$ (2) treated Montmorillionite, Support 5

Support 1 (3.6915 g) was slurried in 25 mL of toluene. AliBu(oct-1-en-7-yl)$_2$ (0.8443, 2.755 mmol) was dissolved in 5 mL of toluene and added to the slurry. The slurry was stirred for 1 hr at 60° C. $^1$H NMR analysis showed an excess of the aluminum species. The slurry was then filtered, washed three times with 15 mL each of toluene, washed twice with pentane, and then dried under vacuum to give 3.9629 g of tan solid.

Supported Catalyst Syntheses

Supported Catalyst A1:

Support 4 (0.6537 g) was slurried in 15 mL of toluene. 10.2 mg of (1,3-Me,nBuCp)$_2$ZrMe$_2$, Complex A (0.0260 mmol), was dissolved in 5 mL of toluene and added to the slurry. The slurry stirred for 1 hr. The slurry was then filtered, washed three times with 15 mL of toluene each, washed with pentane, and dried under vacuum to give 0.6651 g of tan solid.

Supported Catalyst A2:

Support 5 (0.8798 g) was slurried in 15 mL of toluene. 13.7 mg of (1,3-Me,nBuCp)$_2$ZrMe$_2$, Complex A (0.0350 mmol), was dissolved in 5 mL of toluene and added to the slurry. The slurry stirred for 1 hr and 15 min. The slurry was then filtered, washed three times with 15 mL of toluene each, washed with pentane, and dried under vacuum to give 0.8233 g of tan solid.

Supported Catalyst B:

Support 4 (0.5855 g) was slurried in 15 mL of toluene. 9.6 mg of dimethylsilylene(2,3,4,5-tetramethylcyclopentadienyl)(indenyl)zirconium dimethyl, Complex B (0.0232 mmol) was dissolved in 5 mL of toluene and added to the slurry. The slurry stirred for 1 hr and 10 min. The slurry was then filtered, washed three times with 15 mL of toluene each, washed with pentane, and dried under vacuum to give 0.5453 g of tan solid.

Supported Catalyst C:

Support 4 (0.6417 g) was slurried in 15 mL of toluene. Complex C (21.3 mg, 0.0256 mmol) was dissolved in 5 mL of toluene and added to the slurry. The slurry stirred for 1 hr and 10 min. The slurry was then filtered, washed three times with 15 mL of toluene each, washed with pentane, and dried under vacuum to give 0.6165 g of tan solid.

Supported Catalyst D:

Support 4 (0.7875 g) was slurried in 15 mL of toluene. Complex D, rac-Me$_2$Si(H$_4$Ind)$_2$ZrMe$_2$ (12.7 mg, 0.0303 mmol), was dissolved in 5 mL of toluene and added to the slurry. The slurry stirred for 1 hr and 25 min. The slurry was then filtered, washed three times with 15 mL of toluene each, washed with pentane, and dried under vacuum to give 0.7186 g of tan solid.

Ethylene Polymerization

A 2 L autoclave reactor was baked out at 100° C. for at least 1 h. The reactor was cooled to room temperature. 2 mL of a 0.091 M TnOAl solution in hexane was loaded into a catalyst tube as a scavenger and injected into the reactor with nitrogen gas. The nitrogen in the reactor was vented down until the pressure was just above ambient pressure. 600 mL of isohexane was added to the reactor. The reactor was heated to 85° C. and the stir rate was set to 500 rpm. When the proper temperature had been reached 20 psi of ethylene was added to the reactor. A second cat tube containing the catalyst system and 2 mL of pentane was then attached to the reactor. The catalyst system was pushed into the reactor with 200 mL of isohexane. A constant ethylene pressure, approximately 130 psi on top of the pressure of isohexane, approximately 190 psi total, was bubbled through the catalyst tube and the reactor's dip tube. The reactor stirred for 30 min before being vented and cooled down. The polymer was collected in a beaker and placed under air purge to evaporate the isohexane and collect the dry polymer.

Ethylene-Hexene Copolymerization

A 2 L autoclave reactor was baked out at 100° C. for at least 1 hour. The reactor was cooled to room temperature. 2 mL of a 0.091 M TnOAl solution in hexane was loaded into a catalyst tube as a scavenger and injected into the reactor with nitrogen gas. The nitrogen in the reactor was vented down until the pressure was just above ambient pressure. 300 mL of isohexane was added to the reactor. A second catalyst tube containing 1-hexene as then attached to the reactor. The 1-hexene was injected with an additional 300 mL of isohexane. The reactor was heated to 85° C. and the stir rate was set to 500 rpm. When the proper temperature was reached, 20 psi of ethylene was added to the reactor. A third catalyst tube containing the catalyst system and 2 mL of pentane was then attached to the reactor. The catalyst system was pushed into the reactor with 200 mL of isohexane. A constant ethylene pressure, approximately 130 psi on top of the pressure of isohexane, approximately 190-200 psi total, was bubbled through the catalyst tube and the reactor's dip tube. The reactor was stirred for 30 min before being vented and cooled down. The polymer was collected in a beaker and placed under air or nitrogen purge to evaporate the isohexane and collect the dry polymer.

Data for all polymerizations is reported in Table 1.

TABLE 1

| Supported Catalyst | Catalyst | Support | Hexene Loading (mls) | PE Yield (grams) | Act (gPE/ gscat * hr) | MI (dg/min) | MIR | Mw** (kg/mol) | Mn** (kg/mol) | Mw/Mn | Methyls per 1000 C. $^1$HNMR |
|---|---|---|---|---|---|---|---|---|---|---|---|
| A2 | A | 5 | 10 | 15.9 | 665.8 | 0.178 | 19.2 | 198 | 89.7 | 2.21 | 2.3 |
| A2 | A | 5 | 0 | 7.96 | 338.9 | 0.049 | 32.2 | 221 | 87.5 | 2.53 | 0 |
| A2 | A | 5 | 10 | 14.5 | 504.6 | 0.092 | 34.9 | 172 | 85.3 | 2.02 | 2.2 |
| A1 | A | 4 | 10 | 10.8 | 374 | 0.187 | 20.8 | 183 | 71.5 | 2.56 | 2.2 |
| A1 | A | 4 | 0 | 9.31 | 309.4 | 0.043 | 32.9 | 245 | 73.3 | 3.34 | 0 |
| B | B | 4 | 10 | 45.6 | 1516 | 3.275 | 18.5 | 83.3 | 35.8 | 2.33 | |

TABLE 1-continued

| Supported Catalyst | Catalyst | Support | Hexene Loading (mls) | PE Yield (grams) | Act (gPE/gscat * hr) | MI (dg/min) | MIR | Mw** (kg/mol) | Mn** (kg/mol) | Mw/Mn | Methyls per 1000 C. $^1$HNMR |
|---|---|---|---|---|---|---|---|---|---|---|---|
| B | B | 4 | 0 | 26.9 | 1514 | 1.688 | 22.1 | 96.4 | 40.6 | 2.37 | 1.3 |
| C | C | 4 | 10 | 26.9 | 947.2 | | | | | | |
| C | C | 4 | 0 | 20.8 | 693.6 | | | | | | |
| D | D | 4 | 10 | 11.6 | 348.8 | 1.556 | 27.2 | 107 | 34.6 | 3.09 | 4.6 |
| D | D | 4 | 0 | 18.4 | 466.4 | 0.79 | 21.3 | 129 | 41.1 | 3.14 | 1.1 |

**GPC-DRI

Room Temperature (RT) is 25° C. unless otherwise indicated.

Products were characterized as follows:

$^1$H NMR $^1$H NMR data was collected at room temperature in a 5 mm probe using a Varian spectrometer with a $^1$H frequency of at least 400 MHz. Data was recorded using a maximum pulse width of 45° C., 8 seconds between pulses and signal averaging 120 transients.

$^1$H-NMR Spectroscopic Characterization of Al Alkenyls.

The aluminum alkenyls presented here may be described using the formula Al($^i$Bu)$_x$(alkenyl)$_y$, where x+y=3. This formulation represents the observed average of organoaluminum species present in the mixture, which may include any of Al(alkyl)$_3$, Al(alkyl)$_2$(alkenyl), Al(alkyl)(alkenyl)$_2$, and Al(alkenyl)$_3$. $^1$H NMR spectroscopic studies were performed using a Bruker 400 or 500 MHz NMR. Data was collected using samples prepared by dissolving 10-20 mg the compound in 1 mL of C$_6$D$_6$. Samples were then loaded into 5 mm NMR tubes for data collection. The chemical shifts (δ) presented are relative to the residual protium in the deuterated solvent at 7.15 ppm.

Certain aluminum alkenyls may be described using the formula ($^i$Bu)$_x$Al(oct-1-en-7-yl)$_y$, where x+y=3. This formulation represents the observed average of organoaluminum species present in the mixture, which may include Al($^i$Bu)$_3$, Al($^i$Bu)$_2$(oct-1-en-7-yl), Al($^i$Bu)(oct-1-en-7-yl)$_2$, Al(oct-1-en-7-yl)$_3$. In certain preparations the mixture may also be contaminated with z molar equivalents of a triene, such as 7-methylenepentadeca-1,14-diene. The amount of 7-methylenepentadeca-1,14-diene present is determined from the ratio of the integrated signals in the vinylidene region (4.65-4.9 ppm) to the signals in the aluminum-CH$_2$— region (0.2-0.65 ppm). The values of x and y were determined from the ratio of the integrated signals for the upfield Al-isobutyl resonances (observed as a doublet at ~0.3 ppm) to the upfield Al-octenyl resonances (observed as a multiplet at ~0.5 ppm).

Gel Permeation Chromatography

Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001 volume 34(19), pages 6812-6820).

All molecular weights are weight average unless otherwise noted. All molecular weights are reported in g/mol unless otherwise noted.

Hexene wt % is estimated by $^1$H NMR.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

All documents described herein are incorporated by reference herein for purposes of all jurisdictions where such practice is allowed, including any priority documents, related applications, and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A catalyst system comprising ion-exchange layered silicate, a catalyst compound, and an aluminum compound composition represented by formula:

$$Al(R')_{3-v}(R'')_v$$

wherein each R', independently, is a C1-C30 hydrocarbyl group;
each R'', independently, is a linear C4-C20 hydrocarbenyl group, having an end-vinyl group; and
v is from 0.1 to 3.

2. The catalyst system of claim 1, wherein R'' is butenyl, pentenyl, heptenyl, or octenyl.

3. The catalyst system of claim 1, wherein R'' is octenyl.

4. The catalyst system of claim 1, wherein the aluminum compound composition contains less than 20 weight percent of dimer.

5. The catalyst system of claim 1, wherein the aluminum compound composition comprises diisobutyl(oct-7-en-1-yl)aluminum and/or isobutyldi(oct-7-en-1-yl)aluminum.

6. The catalyst system of claim 1, wherein the aluminum compound composition comprises tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-8-en-1-yl)aluminum, diisobutyl(dodec-10-en-1-yl)aluminum, or a mixture thereof.

7. The catalyst system of claim 1, wherein the ion-exchange layered silicate is natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials or a mixture thereof.

8. The catalyst system of claim 1, wherein R' is methyl, ethyl, propyl, isobutyl, or butyl.

9. The catalyst system of claim 1, wherein R' is isobutyl.

10. The catalyst system of claim 1, wherein v is about 2.

11. The catalyst system of claim 1, wherein the aluminum compound composition contains less than 1 weight percent of dimer.

12. The catalyst system of claim 1, wherein the catalyst compound is represented by the formula:

$$T_j L^A L^B L^c_i MDE$$

where, M is a group 3, 4, 5, or 6 transition metal atom, or a lanthanide metal atom, or actinide metal atom; $L^A$ is a substituted or unsubstituted monocyclic or polycyclic arenyl pi-bonded to M; $L^B$ is as defined for $L^A$ or is J, a hetero-atom ancillary ligand bonded to M through the heteroatom; the $L^A$ and $L^B$ ligands are optionally covalently bridged together through a bridging group, T, wherein j is 0 or 1; $L^c_i$ is an optional neutral, non-oxidizing ligand having a dative bond to M; i equals 0, 1, 2 or 3; D and E are independently mono-anionic labile ligands, each having a sigma-bond to M, optionally bridged to each other or to $L^A$, $L^B$ or $L^c$, and T is a bridging group represented by the formula R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R' C=CR', R'$_2$CSiR'$_2$, R'$_2$SiSiR'$_2$, R'$_2$CSiR'$_2$CR'$_2$, R'$_2$SiCR'$_2$SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'B, R'$_2$C—BR', R'$_2$C—BR'—CR'$_2$, R'$_2$C—O—CR'$_2$, R'$_2$C—S—CR'$_2$, R'$_2$C—Se—CR'$_2$, R'$_2$C—NR'—CR'$_2$, or R'$_2$C—PR'—CR'$_2$ where R' is hydrogen or a $C_1$-$C_{20}$ containing hydrocarbyl or substituted hydrocarbyl and optionally two or more adjacent R' optionally join to form a substituted or unsubstituted, saturated, partially unsaturated or aromatic, cyclic or polycyclic substituent.

13. The catalyst system of claim 1, wherein the catalyst compound is one or more of:
rac-dimethylsilylbis[(2-methyl-4-phenyl)indenyl] zirconiumdimethyl;

rac-dimethylsilylbis[(2-methyl)indenyl] zirconiumdimethyl;
rac-dimethylsilyl-bis(indenyl)hafniumdimethyl;
rac-dimethylsilyl-bis(indenyl)hafniumdichloride;
rac-dimethylsilyl-bis(indenyl)zirconiumdimethyl;
rac-dimethylsilyl-bis(indenyl)zirconiumdichloride;
rac-dimethylsilyl-bis(2-methyl-4-phenyl-indenyl)hafniumdimethyl;
rac-dimethylsilyl-bis(2-methyl-4-phenyl-indenyl)hafniumdichloride;
rac-dimethylsilyl-bis(2-methyl-4-phenyl-indenyl)zirconiumdimethyl;
rac-dimethylsilyl-bis(2-methyl-4-phenyl-indenyl)zirconiumdichloride;
rac-dimethylsilyl-bis(2-methyl-benzindenyl)hafniumdimethyl;
rac-dimethylsilyl-bis(2-methyl-benzindenyl)hafniumdichloride;
rac-dimethylsilyl-bis(2-methyl-benzindenyl)zirconiumdimethyl;
rac-dimethylsilyl-bis(2-methyl-benzindenyl)zirconiumdichloride;
bis(1-methyl,4-butylcyclopentadienyl)zirconiumdichloride;
bis(1-methyl,4-butylcyclopentadienyl)zirconiumdimethyl;
bis(1-methyl,4-butylcyclopentadienyl)zirconiumdimethoxide;
bis(1-methyl,4-butylcyclopentadienyl)zirconiumdibenzyl;
bis(1-methyl,4-butylcyclopentadienyl)zirconiumdifluoride;
bis(1-methyl,4-butylcyclopentadienyl)zirconiumdiamide;
bis(1-methyl,4-ethylcyclopentadienyl)zirconiumdichloride;
bis(1-methyl,4-ethylcyclopentadienyl)zirconiumdimethyl;
bis(1-methyl,4-benzylcyclopentadienyl)zirconiumdichloride;
bis(1-methyl,4-benzylcyclopentadienyl)zirconiumdimethyl;
bis(1-methyl,3-butylcyclopentadienyl)zirconiumdichloride;
bis(1-methyl,3-butylcyclopentadienyl)zirconiumdimethyl;
bis(1-methyl,3-n-propylcyclopentadienyl)zirconiumdichloride;
bis(1-methyl,3-n-propylcyclopentadienyl)zirconiumdimethyl;
1,1'-bis(4-triethylsilylphenyl)methylene-(cyclopentadienyl)(2,7-di-tert-butyl-fluoren-9-yl)hafnium dimethyl;
dimethylsilylene(cyclopentadienyl)(2,7-di-tert-butyl-fluoren-9-yl)hafnium dimethyl;
dimethylsilylene(cyclopentadienyl)(3,6-di-tert-butyl-fluoren-9-yl)hafnium dimethyl;
diphenylmethylene(cyclopentadienyl)(2,7-di-tert-butyl-fluoren-9-yl)hafnium dimethyl;
diphenylmethylene(cyclopentadienyl)(3,6-di-tert-butyl-fluoren-9-yl)hafnium dimethyl;
isopropylidene(cyclopentadienyl)(2,7-di-tert-butyl-fluoren-9-yl)hafnium dimethyl;
isopropylidene(cyclopentadienyl)(3,6-di-tert-butyl-fluoren-9-yl)hafnium dimethyl;
dimethylsilylene(cyclopentadienyl)(2,7-dimethylfluoren-9-yl)hafnium dimethyl;
dimethylsilylene(cyclopentadienyl)(3,6-dimethylfluoren-9-yl)hafnium dimethyl;
diphenylmethylene(cyclopentadienyl)(2,7-dimethylfluoren-9-yl)hafnium dimethyl;
diphenylmethylene(cyclopentadienyl)(3,6-dimethylfluoren-9-yl)hafnium dimethyl;
dimethyl silylene(cyclopentadienyl)(fluoren-9-yl)hafnium dimethyl;
isopropylidene(cyclopentadienyl)(fluoren-9-yl)hafnium dimethyl;
diphenylmethylene(cyclopentadienyl)(fluoren-9-yl)hafnium dimethyl; and
1,1'-bis(4-triethylsilylphenyl)methylene(cyclopentadienyl)(2,7-di-tert-butyl-fluoren-9-yl)hafnium dimethyl.

14. The catalyst system of claim 1, wherein the catalyst compound is $Me_2Si(2,3,4,5\text{-tetramethylCp})(Cp)ZrMe_2$; $(1,3\text{-Me-nBuCp})_2ZrCl_2$; and/or rac-$Me_2Si(H_4Ind)_2ZrCl_2$.

15. The catalyst system of claim 1, wherein the ion-exchange layered silicate is montmorillonite.

16. The catalyst system of claim 1, further comprising an activator.

17. The catalyst system of claim 16, wherein the activator comprises an alumoxane.

18. The catalyst system of claim 16, wherein the activator comprises a non-coordinating anion.

19. The catalyst system of claim 16, wherein the activator comprises one or more of:
trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH+][B(C_6F_5)_4-]$, 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridine, triphenylcarbenium tetraphenylborate, and triphenylcarbenium tetrakis-(2,3,4,6-tetrafluorophenyl)borate.

20. A polymerization process comprising contacting one or more alkene monomers with the catalyst system of claim 1.

21. The process of claim 20, wherein the monomer comprises ethylene, propylene, or ethylene and propylene.

22. The process of claim 20, wherein the polymerization is conducted in gas phase or as a slurry.

23. The process of claim 20, further comprising obtaining a composition comprising a polymer and ion-exchange layered silicate with an aluminum alkylene or aluminum dialkylene appended thereto.

24. A polymerization process comprising contacting one or more alkene monomers with the catalyst system of claim 2, wherein R' is methyl, ethyl, propyl, isobutyl or butyl.

25. A polymerization process comprising contacting one or more alkene monomers with the catalyst system of claim 4.

26. A polymerization process comprising contacting one or more alkene monomers with the catalyst system of claim 6.

27. A polymerization process comprising contacting one or more alkene monomers with the catalyst system of claim 11.

28. A polymerization process comprising contacting one or more alkene monomers with the catalyst system of claim 12.

29. A polymerization process comprising contacting one or more alkene monomers with the catalyst system of claim 13.

30. A polymerization process comprising contacting one or more alkene monomers with the catalyst system of claim 14.

31. A polymerization process comprising contacting one or more alkene monomers with the catalyst system of claim 19.

32. The catalyst system of claim 12, wherein T is a bridging group represented by the formula $R'_2C$, $R'_2Si$, $R'_2SiSiR'_2$, where R' is hydrogen or a $C_1$-$C_{20}$ containing hydrocarbyl or substituted hydrocarbyl and optionally two or more adjacent R' optionally join to form a substituted or unsubstituted, saturated, partially unsaturated or aromatic, cyclic or polycyclic sub stituent.

33. The catalyst system of claim 12, wherein T is a bridging group selected from $CH_2$, $CH_2CH_2$, $CMe_2$, $SiMe_2$, $SiEt_2$, $SiPh_2$, $SiMePh$, $Si(CH_2)_3$, $Si(CH_2)_4$, $Si(CH_2)_5$, or $Si(Ph-p-SiEt_3)_2$.

34. The catalyst system of claim 1, wherein the linear $C_4$-$C_{20}$ hydrocarbenyl group is represented by the formula $CH_2=CH-CH_2-R^{}$, where $R^{}$ represents a linear $C_4$ to $C_{20}$ alkylene.

35. The catalyst system of claim 1, wherein the linear $C_4$-$C_{20}$ hydrocarbenyl group is represented by the formula $CH_2=CH-CH_2-R^{}$, where $R^{}$ is selected from the group consisting of: butandiyl $[(CH_2)_4]$, pentandiyl $[(CH_2)_5]$, hexandiyl $[(CH_2)_6]$, heptandiyl $[(CH_2)_7]$, octandiyl $[(CH_2)_8]$, nonandiyl $[(CH_2)_9]$, decandiyl $[(CH_2)_{10}]$, undecandiyl $[(CH_2)_{11}]$, dodecandiyl $[(CH_2)_{12}]$, and an isomer thereof.

36. The catalyst system of claim 1, wherein the linear $C_4$-$C_{20}$ hydrocarbenyl group is a non-substituted linear hydrocarbenyl group.

37. The catalyst system of claim 1, wherein v is 0.5 to 2.9.
38. The catalyst system of claim 1, wherein v is 1.1 to 2.9.
39. The catalyst system of claim 1, wherein v is 1.5 to 2.7.
40. The catalyst system of claim 1, wherein v is 1.5 to 2.5.
41. The catalyst system of claim 1, wherein v is 1.8 to 2.2.
42. The catalyst system of claim 1, wherein the catalyst compound is represented by the formula:

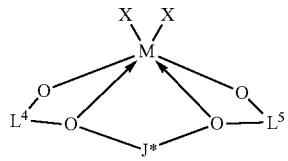

where:
J* is a divalent bridging group comprising C, Si, or both; M is a group 4 metal; O is oxygen; each X is independently a univalent anionic ligand, or two Xs are joined and bound to the metal atom to form a metallocycle ring, or two Xs are joined to form a chelating ligand, a diene ligand, or an alkylidene ligand; and $L^4$ and $L^5$ are independently, a substituted monocyclic or polycyclic aromatic groups.

43. The catalyst system of claim 1, wherein the catalyst compound is represented by the formula:

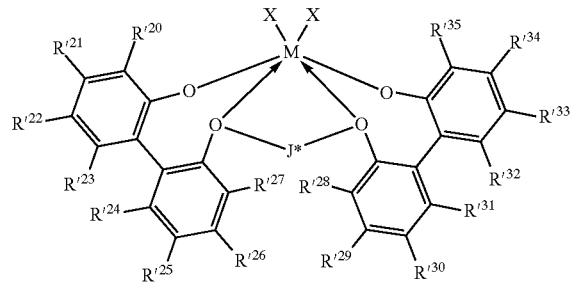

where:
J* is a divalent bridging group comprising C, Si, or both; M is a group 4 metal; O is oxygen; each X is independently a univalent anionic ligand, or two Xs are joined and bound to the metal atom to form a metallocycle ring, or two Xs are joined to form a chelating ligand, a diene ligand, or an alkylidene ligand; and $R'^{20}$, $R'^{21}$, $R'^{22}$, $R'^{23}$, $R'^{24}$, $R'^{25}$, $R'^{26}$, $R'^{27}$, $R'^{28}$, $R'^{29}$, $R'^{30}$, $R'^{31}$, $R'^{32}$, $R'^{33}$, $R'^{34}$, and $R'^{35}$ is independently hydrogen, halo, $C_1$-$C_{50}$ hydrocarbyl, substituted hydrocarbyl, halocarbyl or substituted halocarbyl.

44. The catalyst system of claim 1, wherein the catalyst compound is represented by the formula:

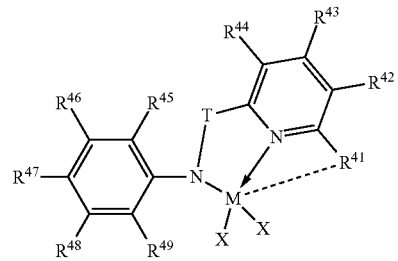

wherein, M is a group 4 metal; T is a divalent bridging group comprising carbon and/or silicon; each X is independently a univalent anionic ligand, or two Xs are joined and bound to the metal atom to form a metallocycle ring, or two Xs are joined to form a chelating ligand, a diene ligand, or an alkylidene ligand; N is nitrogen; each $R^{41}$, $R^{42}$, $R^{43}$, and $R^{44}$ are independently hydrogen, halo, alkyl, cycloalkyl, heteroalkyl, heterocycloalkyl, aryl or silyl group, or one or more adjacent $R^{41}$-$R^{44}$ are optionally joined together to form a fused ring derivative; $R^{45}$-$R^{49}$ are independently hydrogen, or $C_1$-$C_{10}$ alkyl; and bonds, optional bonds and dative bonds are represented by lines, dotted lines and arrows, respectively.

45. The catalyst system of claim 1, wherein the catalyst compound is represented by one of the formula:

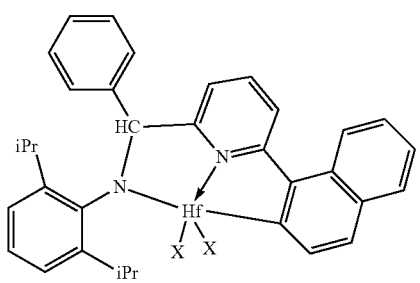

-continued

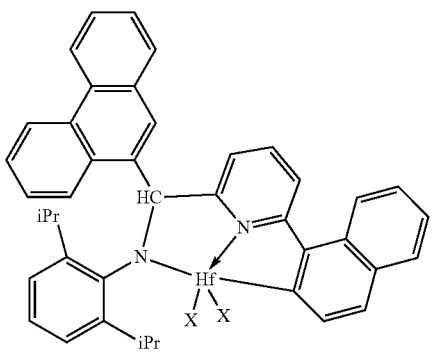

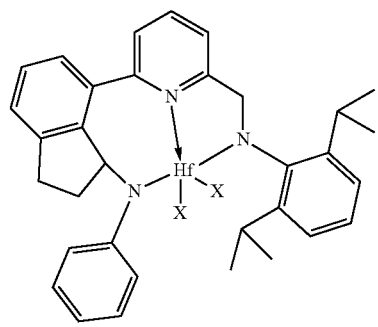

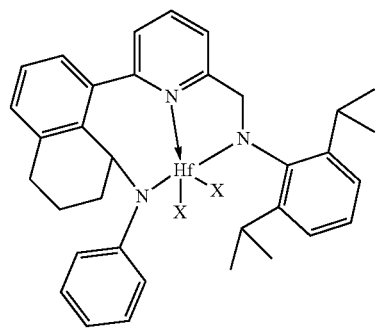

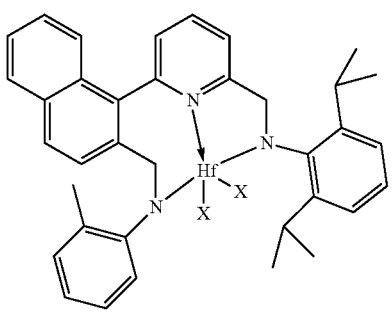

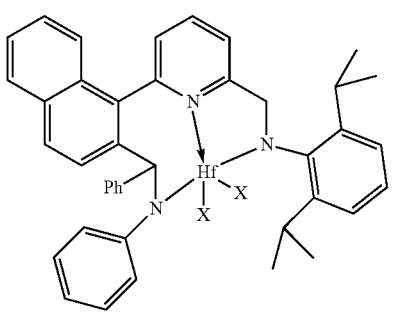

-continued

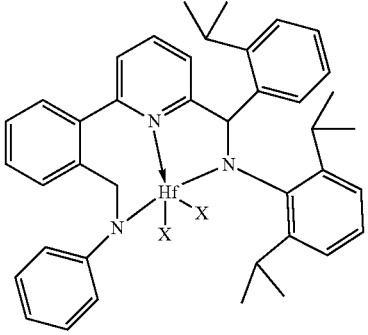

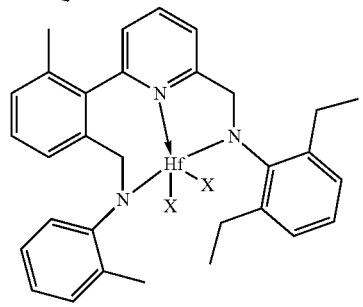

wherein X is methyl, benzyl or chloro.

46. The catalyst system of claim 1, wherein the catalyst compound is represented by the formula:

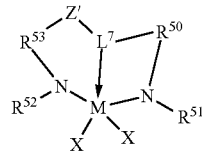

wherein, M is a group 4 metal; N is nitrogen; $L^7$ is a group that links $R^{50}$ to Z' by a three atom bridge with the central of the three atoms being a group 15 or 16 element that forms a dative bond to M, and is a $C_5$-$C_{20}$ heteroaryl group containing a Lewis base functionality; Z' is a divalent linker group, $(R^{56})_pC$-$C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7 or 8 ring carbon atoms and where the substituents on the ring optionally join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ are optionally joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X is independently a univalent anionic ligand, or two Xs are joined and bound to the metal atom to form a metallocycle ring, or two Xs are joined to form a chelating ligand, a diene ligand, or an alkylidene ligand.

47. The catalyst system of claim 46, wherein the catalyst compound is represented by the formula:

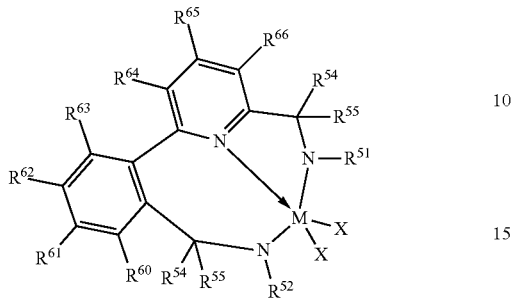

wherein M, X, N, $R^{51}$, $R^{52}$, $R^{54}$, and $R^{55}$ are as previously defined in claim 46; $R^{60}$, $R^{61}$, $R^{62}$, $R^{63}$, $R^{64}$, $R^{65}$, and $R^{66}$ are independently selected from the group consisting of hydrogen, hydrocarbyls, substituted hydrocarbyls, alkoxy, aryloxy, halogen, amino, and silyl, and wherein any one or more adjacent $R^{60}$-$R^{66}$ are optionally joined to form a substituted or unsubstituted hydrocarbyl or heterocyclic ring, wherein the ring has 5, 6, 7, or 8 ring atoms and where substitutions on the ring can join to form additional rings.

* * * * *